(12) United States Patent
Pizlo et al.

(10) Patent No.: US 8,245,005 B2
(45) Date of Patent: Aug. 14, 2012

(54) PROBABILISTIC OBJECT RELOCATION

(75) Inventors: Filip Pizlo, West Lafayette, IN (US); Erez Petrank, Redmond, WA (US); Bjarne Steensgaard, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 677 days.

(21) Appl. No.: 12/041,380

(22) Filed: Mar. 3, 2008

(65) Prior Publication Data

US 2009/0222634 A1   Sep. 3, 2009

(51) Int. Cl.
G06F 12/00 (2006.01)

(52) U.S. Cl. .................................. 711/165; 711/166
(58) Field of Classification Search .................. 711/165
See application file for complete search history.

(56) References Cited

U.S. PATENT DOCUMENTS

| | | |
|---|---|---|
| 5,088,036 A | 2/1992 | Ellis et al. |
| 5,812,702 A | 9/1998 | Kundu |
| 5,873,105 A | 2/1999 | Tremblay et al. |
| 6,424,977 B1 | 7/2002 | Garthwaite |
| 6,427,154 B1 | 7/2002 | Kolodner et al. |
| 6,430,580 B1 | 8/2002 | Azagury et al. |
| 6,446,257 B1 | 9/2002 | Pradhan et al. |
| 6,502,111 B1 | 12/2002 | Dussud |
| 6,671,707 B1 | 12/2003 | Hudson et al. |
| 6,707,952 B1 | 3/2004 | Tan et al. |
| 6,757,442 B1 | 6/2004 | Avinash |
| 6,920,541 B2 | 7/2005 | Kolodner et al. |
| 7,043,509 B2 | 5/2006 | Detlefs |
| 7,069,281 B2 | 6/2006 | Garthwaite |
| 7,092,978 B2 | 8/2006 | Garthwaite |
| 7,102,638 B2 | 9/2006 | Raskar et al. |
| 7,146,059 B1 | 12/2006 | Durand et al. |
| 7,155,067 B2 | 12/2006 | Jayant et al. |
| 7,174,039 B2 | 2/2007 | Koo et al. |
| 7,174,354 B2 | 2/2007 | Andreasson |
| 2005/0021576 A1 | 1/2005 | Barabash et al. |

(Continued)

FOREIGN PATENT DOCUMENTS

EP  1816602 A1  8/2007

OTHER PUBLICATIONS

U.S. Appl. No. 12/038,816, filed Feb. 28, 2008, Bennett et al.

(Continued)

*Primary Examiner* — Tuan Thai
*Assistant Examiner* — Ngoc Dinh
(74) *Attorney, Agent, or Firm* — Microsoft Corporation

(57) ABSTRACT

Object relocation often involves a multi-word copy of the object from a source memory to a destination memory, followed by updating the references (e.g., pointers) to the object. However, during the relocation, other threads may write to portions of the object that have already been relocated, and the updates may be lost when the references are updated to point to the destination memory. The object relocation may therefore mark the words of the object during relocation with a relocation value to indicate transfer to the destination memory without locking the threads. The threads may be configured to check the value the source memory during object access, and to access the corresponding word of the destination memory if the source memory word comprises the relocation value. While the probability of a large (e.g., 64-bit) relocation value appearing in the object is small, safety measures are provided to detect and mitigate conflicts.

20 Claims, 14 Drawing Sheets

U.S. PATENT DOCUMENTS

| | | | |
|---|---|---|---|
| 2005/0138092 | A1 | 6/2005 | Abuaiadh et al. |
| 2005/0138319 | A1* | 6/2005 | Abuaiadh et al. ............ 711/170 |
| 2005/0149587 | A1 | 7/2005 | Bacon et al. |
| 2005/0149589 | A1 | 7/2005 | Bacon et al. |
| 2005/0198088 | A1* | 9/2005 | Subramoney et al. ........ 707/206 |
| 2006/0085433 | A1 | 4/2006 | Bacon et al. |
| 2006/0155791 | A1 | 7/2006 | Tene et al. |
| 2007/0036456 | A1 | 2/2007 | Hooper |
| 2007/0162528 | A1* | 7/2007 | Wright et al. ................ 707/206 |
| 2007/0165962 | A1 | 7/2007 | Smirnov et al. |
| 2007/0174370 | A1 | 7/2007 | Detlefs et al. |
| 2007/0223834 | A1 | 9/2007 | Lertrattanapanich et al. |
| 2009/0248766 | A1* | 10/2009 | Garthwaite et al. .......... 707/206 |

OTHER PUBLICATIONS

U.S. Appl. No. 12/041,354, filed Mar. 3, 2008, Pizlo et al.

Bacon et al., A Real-time Garbage Collector with Low Overhead and Consistent Utilization, IBM T.J. Watson Research Center, Yorktown Heights, NY, Jan. 15-17, 2003, pp. 285-298.

Bennett et al. "Fine Feature Preservation in HDR Tone Mapping", The University of North Carolina at Chapel Hill, Department of Computer Science, p. 1.

HP, Release Notes, Software Development Kit (SDK) v 1.4.2-3 for the OpenVMS Integrity (I64) Operating System for the Java Platform, Nov. 8, 2007, pp. 1-7.

Polesel et al. "Image Enhancement via Adaptive Unsharp Masking", pp. 1-16.

Schoeberl, et al., Garbage Collection for Safety Critical Java, Copyright 2007 ACM, Vienna, Austria, Sep. 26-28, 2007, pp. 1-9.

Vandeginste, et al., Incremental copying garbage collection for WAM-based Prolog systems, Department of Computer Science, K.U. Leuven, Belgium, Aug. 24, 2007, vol. 7, pp. 1-2.

Wu et al. "Feature Matching and Deformation for Texture Synthesis", ACM SIGGRAPH 2004 conference proceedings, University of Illinois, Urbana-Champaign, pp. 1-4.

Paz; et al., "Efficient On-the-Fly Cycle Collection". pp. 1-16.

Huelsbergen; et al., "Very Concurrent Mark-&-Sweep Garbage Collection without Fine-Grain Synchronization", Bell Labs, Lucent Technologies, Murray Hill, NJ, USA., Copyright 1998 ACM.,pp. 166-175.

Printezis; et al., "A Generational Mostly-concurrent Garbage Collector", Jun. 2000, pp. 1-33.

* cited by examiner

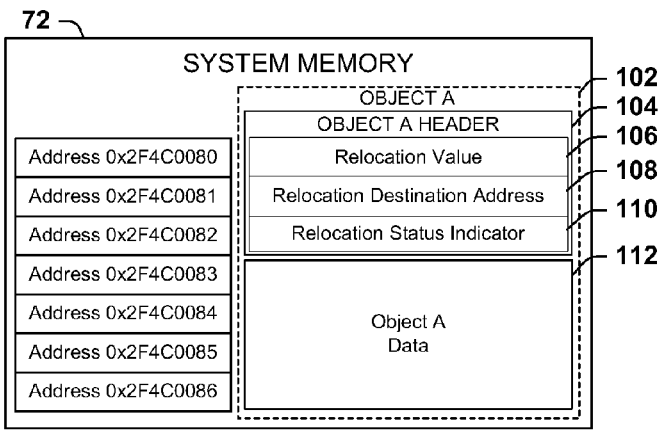
FIG. 6
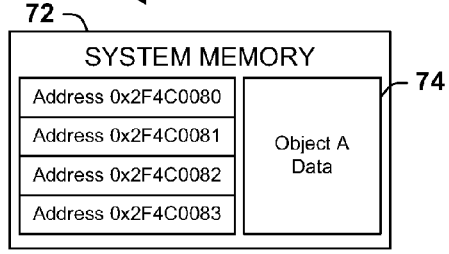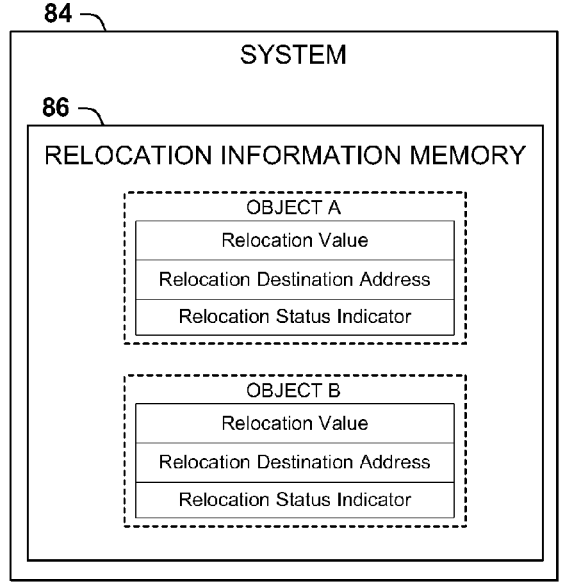
FIG. 7

240 ─↘

242 ─╮

```
                  THREAD WRITE PSEUDOCODE
loop
        x := source[i]
        if x == R
                if relocation acknowledgments pending
                        block until all relocation acknowledgments received
                else
                        target[i] := v
                        break
        else
                if v == R
                        block until copying is complete
                else
                        compare-and-swap source[i], x ---> v
                        if compare-and-swap succeeds
                                break
```

244 ─╮

```
              THREAD COMPARE-AND-SWAP PSEUDOCODE
x := source[i]
if x == R
        if relocation acknowledgments pending
                block until all relocation acknowledgments received
                return false
        else
                return compare-and-swap target[i], c ---> v
else if x == c
        if v == R
                block until copying is complete
                return false
        else
                return compare-and-swap source[i], c ---> v
else
        return false
```

FIG. 18

PROBABILISTIC OBJECT RELOCATION

BACKGROUND

Many scenarios in computer systems involve relocating a block of data, such as the representation of an object, from one area of memory to another. The relocation is generally performed by performing a per-word copy of the data from a source memory to a destination memory. The relocation also involves updating references to the object, such as memory pointers, from the source memory to the destination memory. Once the references are updated, the block of memory in the source memory may be deallocated for reuse.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The relocation of an object in memory through a per-word copy is often not an instantaneous or atomic process. Even in the context of an object embodied in a single memory word, such as an integer, the elements of the relocation process may cause synchronization issues. For example, an integer used in an application thread may be relocated by a memory management thread, such as during a memory compaction. The memory manager may read the integer from the source memory, write the integer to the destination memory, and then update the reference in the application thread to point to the new location. However, in many scenarios, such as multiple threads executing in an environment with preemptive task scheduling or multicore processor architectures, the application thread may execute concurrently with the memory management thread. If the application thread writes a new value to the memory word after the memory management function reads the value to be written, but before the reference in the application thread is updated, then the new integer value will be written to the source memory instead of to the destination memory. The value will therefore be lost when the reference is updated by the memory management thread. It may be possible to apply a synchronization mechanism to the memory location, such as a lock. However, such solutions entail blocking all of the threads that attempt to access the object during the relocation, and the duration of the blocking may significantly diminish the performance of the computer system. Such issues may arise more often where the amount of data to be relocated is large (e.g., for an object comprising a significant amount of data, such as a long array), and/or where the object is accessed, and in particular updated, by a large number of threads.

An alternative technique presented herein involves a non-blocking relocation mechanism, wherein threads are permitted to read, and even to write, to one of the versions of the object during its relocation. The technique involves marking the words of the source object upon relocation of a word to the destination object, such as with a random number chosen at the initiation of the relocation and stored within all words of the object that have been relocated to the destination memory. When a thread endeavors to access a word in an object undergoing relocation, the value stored in the word of the object is checked against the random number chosen for the relocation, and the access is made to the word of the source memory or the word of the destination memory if the stored word differs or equals (respectively) the random number. While the possibility exists that the object may actually store the random number as part of its data set, the magic number may be randomly chosen of a word length that renders this possibility very small. Moreover, some of the circumstances leading to this coincidence may be avoided, e.g., by locking threads that coincidentally attempt to write such a value to the object.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure may become apparent from the following detailed description when considered in conjunction with the annexed drawings.

DESCRIPTION OF THE DRAWINGS

FIG. 6 is a component block diagram illustrating a memory containing an object having an object header.

FIG. 7 is a component block diagram illustrating a portion of an exemplary object relocation system comprising a relocation information memory.

FIG. 18 is an illustration of another set of pseudocode comprising relocation-compliant functions for use during an object relocation.

DETAILED DESCRIPTION

Figure 1:
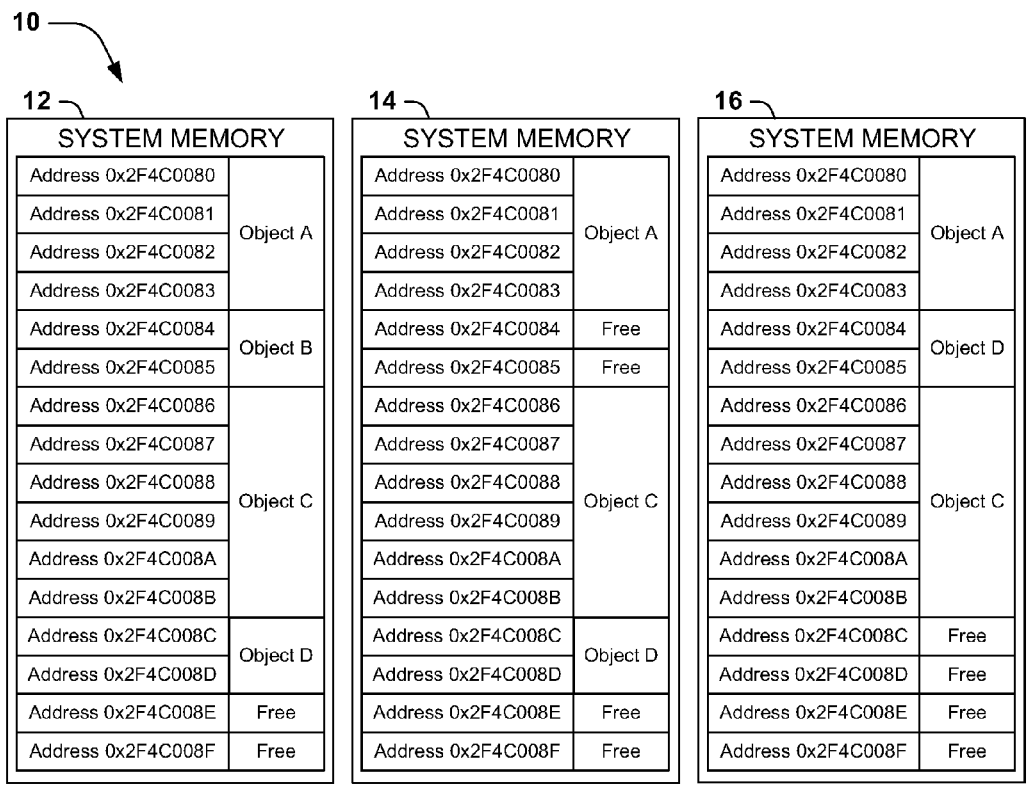
FIG. 1 is an illustration of a set of memory states presenting an exemplary scenario including an object relocation.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Objects in computer systems are stored within allocated blocks of memory, which is typically modeled as a one-dimensional array of words of various sizes (e.g., 32 or 64 bits.) Objects of various sizes may be instantiated by allocating appropriately sized blocks of memory and storing values in a structured order to represent the various fields of the object, as defined by the object class. The objects may then be referenced according to the memory address of the object, and a field within the object may be located according to the class structure.

Many scenarios in computing involve relocating an object from a current block of memory to an allocated block of memory at a different memory address. As one example, a memory manager, such as a garbage collector, may endeavor to compact the system memory in order to reclaim fragmented portions of memory between objects. FIG. 1 illustrates one such example 10, comprising a block of hexadecimally addressed memory, each address comprising one memory word. The first memory state 12 comprises a memory containing three objects: a four-word object A, a two-word object B, a six-word object C, and a two-word object D, with two free words of memory. The example 10 illustrates the consequences of deallocating object B, producing the second memory state 14 comprising a two-word fragment of memory between objects A and C and a two-word fragment of memory after object D. Despite the presence of four free words of memory, the second memory state 14 cannot store a three-word object without spreading the object over the various memory fragments, which may cause inefficiencies and diminished computing performance. Instead, the memory may be compacted by relocating object D to the fragment between objects A and C in order to consolidate the free memory. The resulting third memory state 16 comprises the objects A, C, and D, and also comprises a four-word block of free memory that could be used to store, e.g., a three-word object. Other scenarios that may involve the relocation of objects include dynamically sized objects (e.g., if object A in the example 10 of FIG. 1 changed size to include three additional words), object pooling (e.g., where an object used in the memory space of a first thread is donated to a second thread, and is to be relocated to the memory space of the second thread), and security applications (e.g., where the memory address of a protected object is to be kept secret, and the object may be relocated if the memory address might be detected.)

When an object is to be relocated from a source memory to a destination memory, the object representation may be sequentially copied, in blocks of one or more words, from the source memory to the destination memory. The references to the object may also be updated to reference the object at the destination memory rather than at the source memory. Some various techniques for updating the references may be available; as one example, the computer system may maintain a list of references to the object, and may refer to the list to locate the references to be updated due to the object relocation. After the copying is complete, the allocated block of the source memory may be deallocated to reclaim the memory for other uses.

Figure 2:
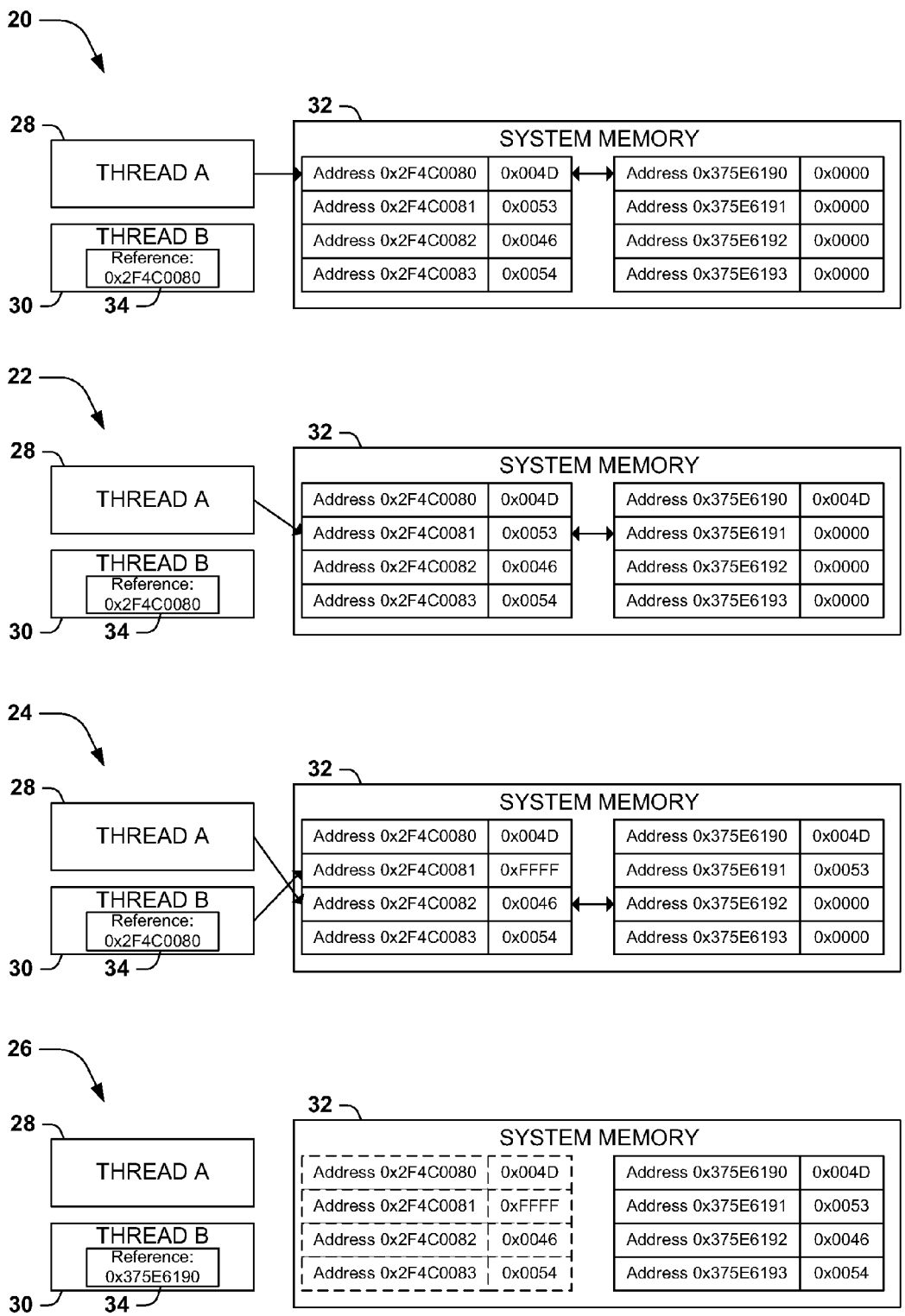
FIG. 2 is an illustration of a set of memory states presenting an exemplary object relocation operation having a lost object update.

However, a problem may arise if the object is relocated while in use. If a thread modifies the object while the object is being relocated, the value written to the object may not be copied to the destination memory, and may therefore be lost. FIG. 2 illustrates an example of this scenario, represented as a set of states illustrating an interaction between two threads—thread A 28 and thread B 30—and a system memory 32. In this example, thread A 28 is relocating an object stored in the system memory 32 from a source memory (at memory address 0x2F4C0080) to a destination memory (at memory address 0x375E6190), while thread B 30 is using the object via an object reference 34 contained in the thread. (In this example and some others discussed herein, the computer system is configured to store a 16-bit word at each address, e.g., 0x0000. While few contemporary computer systems utilize a 16-bit architecture, it may be appreciated that the hypothetical computer system presented in these examples is presented in this manner in the interest of simplified illustration.) In the first state 20, thread A 28 begins copying the object, starting with the first word at 0x2F4C0080. In the second state 22, thread A 28 has copied the first word at 0x2F4C0080 to the corresponding address in the destination memory, and is copying the word at 0x2F4C0081. In the third state 24, thread A 28 has copied the first two words of the object and is copying the word at 0x2F4C0082, but thread B 30 has modified the second word of the object to the value 0xFFFF. Because the object reference 34 within thread B 30 still indicates the location of the object at the source memory, the update by thread B 30 is written to the corresponding address in source memory, i.e., 0x2F4C0081. In the fourth state 26, thread A has finished copying the object, and the object reference 34 within thread B 30 has been updated, and the block of the system memory 32 at the address 0x2F4C0080 in the source memory is deallocated for reuse. However, the version of the object at the destination memory (i.e., 0x375E6190) in the system memory 32 does not contain the updated value 0xFFFF written by thread B 30 to address 0x2F4C0081 during the copying. Hence, the update to the object is lost due to the synchronization issue created during the sequential word relocation technique.

This problem may be mitigated by managing the object according to some concurrency concepts. For example, the thread responsible for performing the relocation (referred to herein as the "relocation thread") may lock the object prior to relocating it, such that no other thread may access the object during the relocation. A thread that attempts to do so may be blocked by the computer system until the relocation is complete, and may then be redirected to access the object in the destination memory. While concurrency techniques may circumvent many problems with concurrent access to the object during relocation, the blocking of a thread may result in degraded performance. This degradation may become undesirably extensive in many circumstances. As one example, a large object comprising many words may be locked for an extended period, and one or more threads attempting to use the object may be stalled while awaiting the completion of the relocation. As a second example, time-sensitive threads, such as threads operating in realtime systems, may be unable to withstand even a brief period of blocking due to an object lock that may result in a missed hard deadline. As a third example, a thread that is blocked for attempting to use an object being relocated may have already obtained locks on one or more other resources to be used by other threads; hence, the locking of a single object may result in gridlock among many threads pending the completion of the relocation. In these and other scenarios, the locking of the object during the relocation may not be feasible due to the potential problems caused by the blocking of threads attempting to access the object.

An alternative technique may be devised for relocating an object in such circumstances while reducing the incidence of lost object updates, and while generally avoiding the use of object locks that result in the blocking of threads attempting to access the object during relocation. This alternative technique involves marking the words of the object in the source memory as the words are moved to the destination memory. The threads may be capable of determining that the object is being relocated to an address comprising the destination memory, and configured to check whether a word of the object has been relocated prior to using it. The threads may then access the words of the object in the source memory that have not yet been relocated, and the words of the object in the destination memory that have been relocated. If these words can be relocated and marked in an effectively instantaneous manner, then threads may work with the object in an apparently seamless manner, despite the fragmentation of the object between the source memory and the destination memory during the relocation.

This technique involves marking of a word in the source memory as having been relocated to the destination memory. The marking may be achieved by storing a special value in the word of the source memory that is commonly known among the threads (including the relocation thread) as indicating that the word has been relocated. For example, the relocation thread may be configured to read a word in the source memory, to write the value of the word to the corresponding word in the destination memory, and then to replace the word in the source memory with this special value (referred to herein as the "relocation value") in order to indicate the relocation of the word. While accessing (e.g., reading or writing) a word of the object in the source memory, the threads may compare the current value of the word in the source memory with the relocation value, and depending on whether or not the comparison succeeds or fails, the threads may interact with the word of the object in (respectively) the source memory or the destination memory. Foregoing a few particular timing issues (discussed in detail herein), this technique permits the threads to interact with the current word of the object in the correct memory location, despite the ongoing relocation process. Moreover, this technique permits the threads to interact with the object without experiencing a lock, either due to a portion of the object being inaccessible or due to a delay in the performance of an instruction in the thread.

Figure 3:
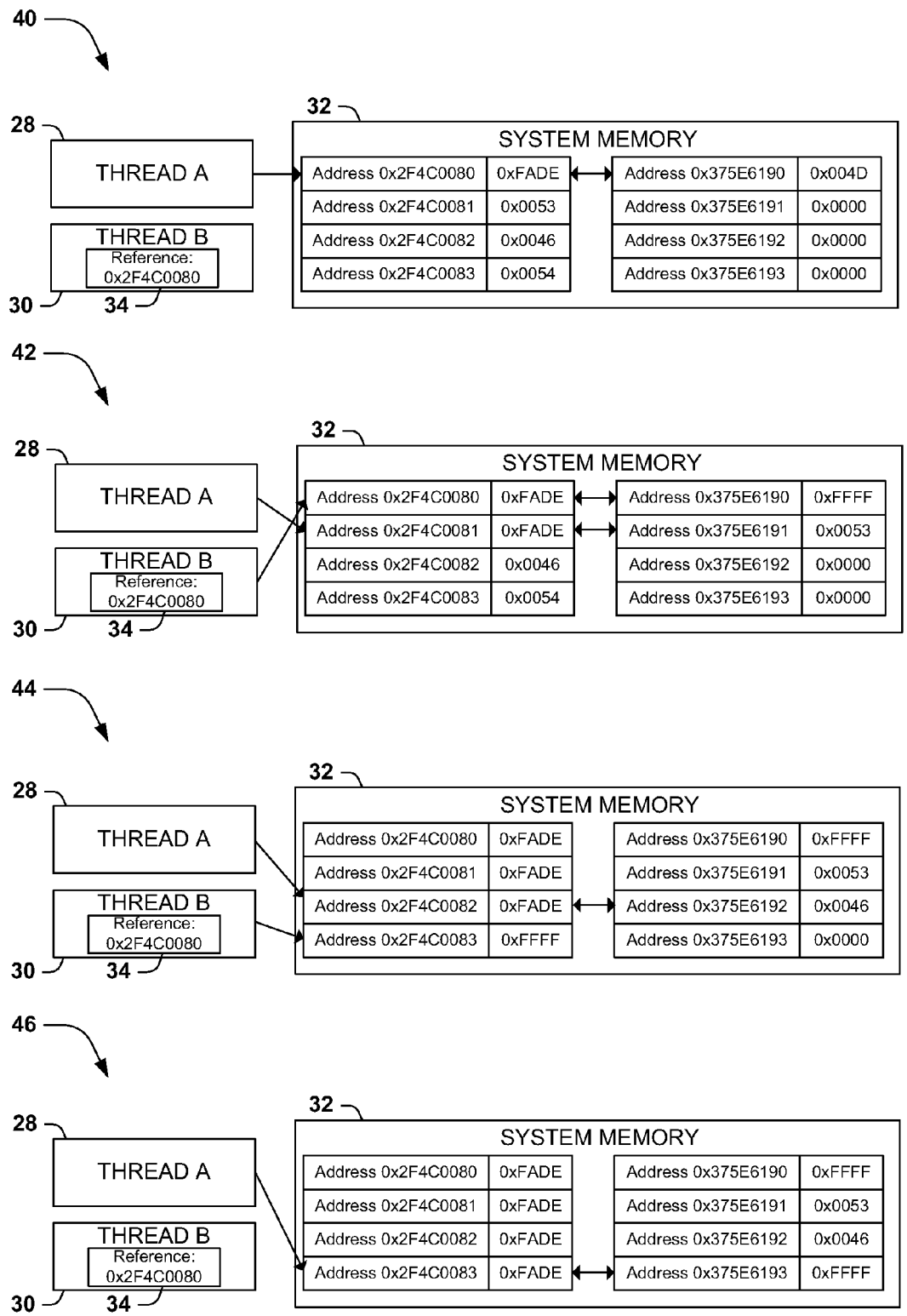
FIG. 3 is an illustration of a set of memory states presenting an exemplary object relocation operation while retaining object updates.

FIG. 3 presents an example of this technique, again comprising an illustration of four memory states, but including the use of a relocation value (hexadecimal value 0xFADE) to indicate the relocation of a word of an object from a source memory to a destination memory. As in FIG. 2, the memory states of FIG. 3 illustrate the interaction of thread A 28 (a relocation thread) and thread B 30 with an object stored in the system memory 32, which is targeted for relocation from the source memory at address 0x2F4C0080 to the destination memory at address 0x375E6190. In the first memory state 40, thread A 28 copies the first word of the object in the source memory (at memory address 0x2F4C0080) to the corresponding word in the destination memory (at memory address 0x375E6190.) In contrast with the first memory state 20 of FIG. 2, thread A 28 in the first memory state 40 of FIG. 3 is also configured to replace the word in the source memory with the relocation value, in this case 0xFADE. This configuration allows thread A 28 to signal to the other threads, including thread B 30, that the word of the object in the source memory has been relocated to a corresponding word of the destination memory. An effect of is signaling is illustrated in the second memory state 42, wherein thread B 30 attempts to write a new value (0xFFFF) to the first word of the source memory in the system memory 32. Rather than writing the new value to the word of the source memory, thread B 30 detects that the word currently contains the relocation value, and so directs the new value to be written to the word of the destination memory corresponding to the targeted word of the source memory in the system memory 32. Meanwhile, thread A 28 relocates the second word of the source memory (at memory address 0x2F4C0081) to the destination memory and replaces the word in the source memory with the relocation value 0xFADE.

The third memory state 44 of FIG. 3 illustrates a contrasting scenario, wherein, while thread A 28 relocates the third word of the object at memory address 0x2F4C0082, thread B 30 attempts to write a new value (again, 0xFFFF) to the fourth word of the object in the source memory at address 0x2F4C0083. Because the fourth word does not contain the relocation value, thread B 30 writes the new value 0xFFFF to the source memory. Accordingly, in the fourth memory state 46, when thread A 28 reaches the newly written value at address 0x2F4C0083, the thread relocates the value currently residing in the word to the destination memory. Thread A 28 thereby achieves the relocation of the object to the destination memory in the system memory 32 with success, and without locks or blocks that might prevent a thread for performing or handling a time-sensitive event in a meaningful time frame.

Figure 4:
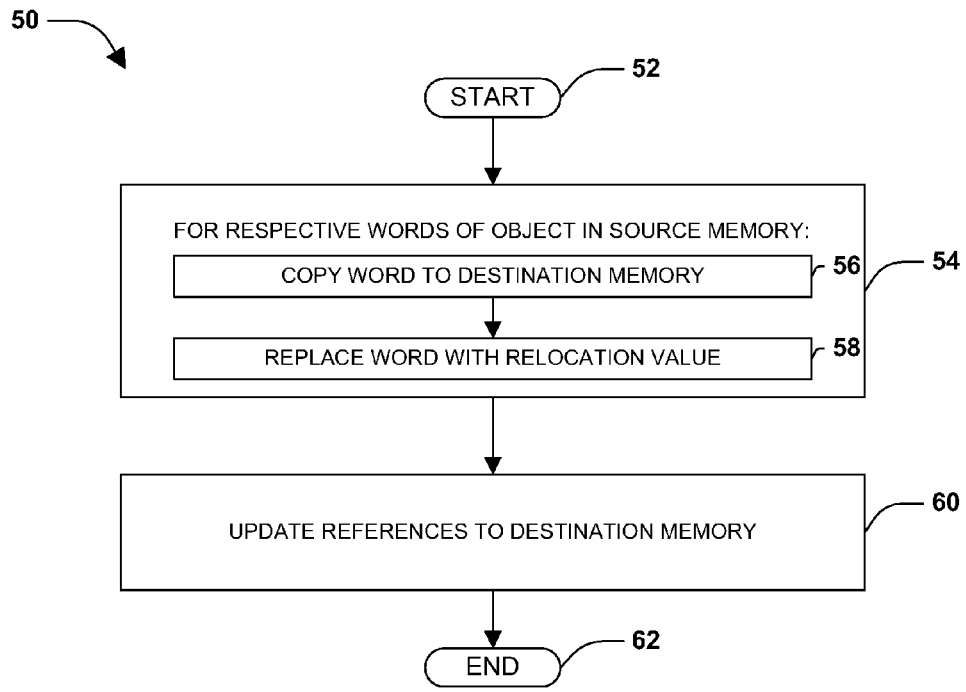
FIG. 4 is a flow diagram illustrating an exemplary method of relocating an object.

This technique for copying of an object may be implemented in many types of embodiments. FIG. 4 illustrates one such embodiment, presented as an exemplary method 50 of relocating to a destination memory an object located in a source memory. Moreover, the object relocated by the exemplary method 50 is referenced by at least one reference, and where the threads are configured to access the words of the object in the destination memory during the relocation where corresponding words in the source memory contain the relocation value. The exemplary method 50 also accomplish the relocation utilizing a relocation value, such as a special value chosen for the relocation. Within this environment, the exemplary method 50 begins at 52 and involves relocating 54 respective words of the object in the source memory. The relocating 54 involves copying 56 the word to the destination memory, and replacing 58 the word with the relocation value. After the relocating 54, the exemplary method 50 involves updating 60 the at least one reference to the destination memory. Having relocated the object to the destination memory through the use of the relocation value to denote relocated words of the object, and having updated the references in the threads, the exemplary method 50 thereby achieves the relocation of the object with reduced concurrent access errors, and therefore ends at 62.

Figure 5:
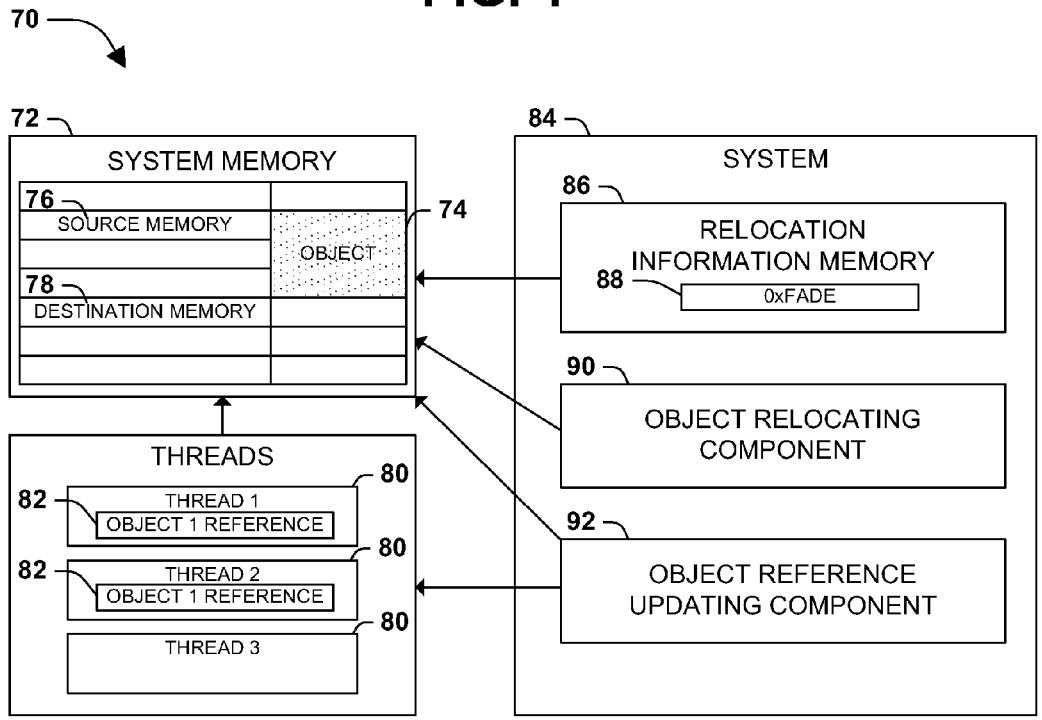
FIG. 5 is a component block diagram illustrating an exemplary object relocation system configured to retain object updates.

FIG. 5 presents a second embodiment of the techniques presented herein, comprising an exemplary system 84 for relocating to a destination memory 78 an object 74 located in a source memory 76, and referenced by at least one object reference 82. The exemplary system 84 comprises a relocation information memory 86, which contains the relocation value 88 to be utilized during the relocation. Within this computing environment, the relocation value 88 is utilized by the threads 80 which are configured to access the words of the object 74 in the destination memory 78 during the relocation where the corresponding words in the source memory 76 contain the relocation value 88 stored in the relocation information memory 86. The exemplary system 84 also comprises an object relocating component 90, which is configured to perform a per-word relocation of the object 74 by copying respective words in the source memory 76 to the destination memory 78 and replacing the relocated words in the source memory 76 with the relocation value 88 stored in the relocation information memory 86. The exemplary system 84 also comprises an object reference updating component 92, which is configured to update the at least one object reference 82 to the destination memory 78. The components of the exemplary system 84 are thereby configured to interoperate in achieving the relocation of the object 74 from the source memory 76 to the destination memory 78 while permitting the threads 80 to access the object 74 during the relocation without the involvement of an object lock or the blocking of the threads 80.

The techniques presented herein, including the exemplary method 50 of FIG. 4 and the exemplary system 84 of FIG. 5, may be embodied with some variations in several aspects, wherein some variations may present additional advantages and/or reduce disadvantages with respect to other variations of these and other techniques. A first aspect that may vary among implementations of these techniques relates to the nature and selection of the relocation value. A problem may arise during the relocation if the relocation value is already stored in the object as an indication of some form of data, or if a thread writes the relocation value to the object during the relocation. The conflicts created by these scenarios may result in incorrect program behavior. As one example, if a thread happens to write the relocation value to a word of the object in the source memory, other threads may incorrectly refer to the corresponding word in the destination memory, which may have a different, and possibly nonsensical, value. If this value arises in a portion of the object comprising code, the value may be translated as a nonsensical instruction; if the value arises in a reference to a function or to another object stored elsewhere in memory, the dereferencing may result in a memory protection exception. Hence, conflicts arising from the inclusion of data in the object that coincidentally equal the relocation value may lead to program faults causing unexpected or inconsistent behavior, data corruption, and program or computer system crashes.

For example, 32-bit architectures are capable of accessing 32-bit words in memory, and the odds of a program choosing this value for a word are $(\frac{1}{2})^{32}$, or approximately one chance in a billion. The odds of choosing such a 32-bit word over many iterations become much less reliable; for instance, the odds of not choosing the value in one million random selections are 1 one in 5,000—an unacceptably high margin of error. And for a computer choosing one million random selections per second, the odds of choosing the random value after one hour are greater than 50%. Although many objects may contain data that likely do not comprise a statistically random distribution of 32-bit words—e.g., 0x00000000 and 0xFFFFFFFF values are likely to be highly abundant, as well as low-value integers and the ASCII codes used to represent common characters in strings—nevertheless, the odds of a conflict between a randomly chosen 32-bit relocation value and a 32-bit word stored in the object are unacceptably high for many applications. Moreover, a statistically small error rate may be acceptable in some computing scenarios that include fault tolerance, such as parity bits or error-correction codes. If the object comprises a media file (e.g., an audio or video recording) that is being rendered by a thread during a relocation, the consequences of an error may be limited to a blip in an audio or video frame, which may be correctable or, if uncorrected, may be small or imperceptible.

However, in scenarios where the consequences of an error are less tolerable, the odds of a coincidental use of the relocation value as data in the object may be significantly reduced by implementing the relocation value as a word of many bits. By taking advantage of the addressable memory word sizes that may be utilized by various architectures, this technique may reduce the odds of a conflict, even over very long time spans, to very nearly zero. For example, memory addressing of 64bit words may be achievable in many architectures, including 64bit architectures that are increasingly common and some 32-bit architectures that provide hardware-level 64bit read/write operations. The odds of choosing a particular 64bit value at random are exceedingly small: $(\frac{1}{2})^{64}$, on the order of $10^{-20}$. Even if configured to select one million values at random per second for a year, a computer system may still exhibit a conflict rate of approximately $10^{-6}$, which is far better than the reliability of computer systems in general. A millennium of such random sampling (at one million samples per second) may result in a less dependable rate of approximately 0.2% chance of one or more conflicts, not accounting for the significant reduction of this possibility due to the considerably uneven statistical distribution of data comprising many objects in practice. Even better odds may be achieved by using 128-bit words, which may be addressable in 128-bit architectures and in some 64bit architectures. The failure rate of the technique for a single selection of a 128-bit word is vanishingly small—on the order of $1 \times 10^{-39}$ approximately Another variation of this first aspect of these techniques relates to the choosing of the relocation value. As one example, the relocation thread may choose a new relocation value at random prior to initiating the relocation of an object, and by communicating the relocation value to the threads. It may be additionally advantageous to configure the random choice to prefer values that are less likely to be used by various objects, e.g., by avoiding the choice of words (or portions thereof, e.g., 32-bit portions of a 64bit word) that may be commonly used, such as 0x00000000, 0xFFFFFFFF, low-value integers, or values corresponding to ASCII codes, which may help to reduce the odds of the relocation value being coincidentally used within an object. This may be achieved, e.g., by randomly choosing a value and then setting the high-order bits to a range of less-used values, such as by setting the highest-order nybble of each 32-bit word to 0xE.

As another example of this variation, a relocation value for relocating any object may be commonly known among the relocation thread and the other threads of the computer system for the relocation of words of objects. The selection of a system-wide value having a special connotation, sometimes known as a "magic number," may serve to simplify the relocation, because the relocation thread may neither have to choose a new relocation value before any relocation nor communicate the chosen relocation value. The magic number may also be advantageously selected as a value that is less commonly utilized in various objects, as may be determined heuristically or by statistical analysis. This example may also improve the performance of the computer system by reducing the references of the threads to the relocation information memory while accessing an object; rather, the magic number may be hard-coded into the logic for accessing words of objects on behalf of threads (e.g., within a runtime configured to provide memory access support to the threads of runtime-hosted applications.) However, this example may have a disadvantage of an increased coincidence of the including of the magic number within one or more objects, e.g., where the object comprises the runtime binary containing the hard-coded magic number, or a reference document that happens to document the magic number. Those of ordinary skill in the art may be able to choose relocation numbers of many sizes and in various ways while implementing the techniques discussed herein.

A second aspect that may vary among implementations of these techniques relates to the manner of communicating the relocation information among the relocation thread and the object threads. For instance, the object referencing threads operate upon the object with reference to the relocation status of the object, the relocation value, and the address of the destination memory to which the object is being relocated. The relocation status indicator may be set to various values to indicate the relocation status of the object (e.g., 0 for no relocation, 1 for ongoing relocation, and 2 for completed indication.) Alternatively or additionally, the relocation status of the object may be indicated through the use of one of the other fields; e.g., the relocation value may be set to 0x00000000 to indicate no current or imminent relocation, to 0xFFFFFFFF to indicate a completed relocation, or an intermediate value to indicate an ongoing relocation utilizing the specified relocation value. In determining an appropriate manner of interacting with an object, a thread may investigate the relocation status indicator of the object, and if the object is being relocated, may compare the value of a word in the source memory against the relocation value, and may reference the corresponding word in the destination memory (indicated by the address and the index of the word within the object.) Those of ordinary skill in the art may be able to devise many types of object headers for indicating the relocation status of an object while implementing the techniques disclosed herein.

These fields may be managed by the relocation thread, and may be communicated to the threads in various manners. As one example, a thread may poll the relocation status of the object during its usage of the object, but such polling may be inefficient (particularly if the relocation of the object is infrequent), and may result in synchronization difficulties. FIG. 6 illustrates a second example 100, wherein a system memory 72 contains an object 102 that comprises an object header 104, which comprising the relocation value 106, an address of the destination memory 108, and a relocation status indicator 110. The relocation thread may manage the object header 104, and the threads may be configured to access these fields of the object while interacting with the current version of the object in case it is being relocated. The object header 104 may be excluded from the per-word relocation of the object, and the relocation thread may be configured to create a new header for the version of the object in the destination memory. The object data 112 may follow the object header 104, and the threads may be configured to reference the fields of the object beginning at the fourth word of the object 102.

FIG. 7 illustrates a third example 120, wherein the system memory 72 contains the object data 74, and the system (such as the exemplary system 84 of FIG. 5) may store within the relocation information memory 86 a relocation value, an address of the destination memory, and a relocation status indicator for each object being relocated. The threads may be configured to consult the relocation thread, and particularly the relocation information memory 86, while interacting with the object to determine whether the object is being relocated, and which words are to be referenced at the destination memory. This technique may better economize the system memory 72 than the inclusion of an object header with each object 74 (especially if object relocation is infrequent), but may cause performance and synchronization issues with respect to the relocation information memory and the relocation thread. Those of ordinary skill in the art may be able to devise many mechanisms for communicating the relocation information for an object among the relocation threads and the object referencing threads while implementing the techniques discussed herein.

A third aspect that may vary among implementations of these techniques relates to the concurrent accessing of the words of the object by the threads, including the relocation thread. In many computing environments, the threads may run concurrently, and the accesses of an object by various threads running concurrently may be interleaved. Such interleaving may occur in many systems, including (e.g.) operating systems featuring preemptive task schedulers; a computer system utilizing a multicore processor or more than one processor, where multiple threads may be executed in parallel; and a networked computer or operating system, in which memory is shared among multiple computers that may concurrently access the same memory. However, in the absence of a synchronization lock, interleaved access may create unexpected and possibly incorrect computing behaviors.

Figure 8:
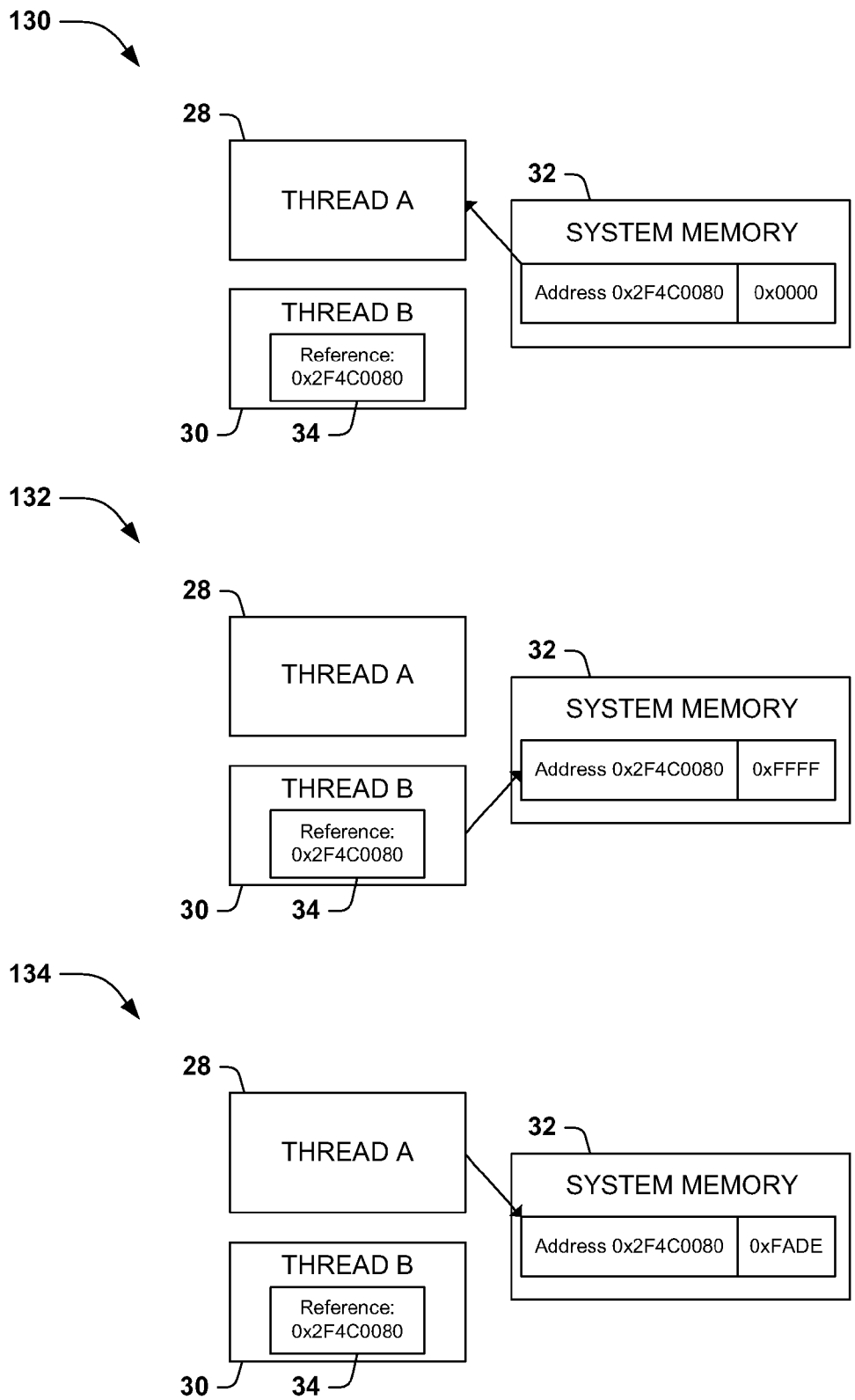
FIG. 8 is an illustration of a set of memory states depicting an interaction of threads with a system memory involving a lost object update.

FIG. 8 illustrates an example of a problem arising from interleaved access to a memory word by multiple threads, which is illustrated according to three memory states in which an object stored in the system memory 32 is concurrently utilized by threads identified as thread A 28 (which may comprise, e.g., a relocation thread) and thread B 30, which contains an object reference 34 to the object. In the first memory state 130, thread A 28 is configured to read a word of the object in the system memory 32, such as a word to be relocated to a destination memory in furtherance of a relocation of the object, and to replace the word with another value, such as a relocation value indicating that the word has been relocated to a destination memory (e.g., 0xFADE.) However, the read and write instructions of thread A 28 comprise two separate operations, and are performed sequentially. In the example of FIG. 8, between the read operation and the write instruction of thread A 28, thread B 30 is permitted to run, and coincidentally is configured to write a value (in this case, 0xFFFF) to the same word of the object in the source memory that thread A 28 is accessing. Accordingly, the second memory state 132 illustrates the word of the system memory 32 containing the new value. However, thread A 28 is then permitted to run again, and proceeds by writing its value to the word in the system memory 32, and unknowingly overwrites the value just written by thread B 30. Moreover, thread A 28 may proceed with the relocation of the object by writing to the destination memory the value of the word that it read in the first memory state 130, i.e., 0x0000. Therefore, the value written by thread B 30 is present in neither the source memory (having been replaced with the relocation value 0xFADE) nor the destination memory, and is therefore lost. This scenario comprises a "write after read (WAR) hazard," and may arise whenever a thread performs a read of a memory address followed by a write to the memory address, even if consecutively executed.

The techniques presented herein may mitigate the problem depicted in FIG. 8 by utilizing a compare-and-swap instruction. The compare-and-swap instruction is typically configured to operate on one or two particular memory word(s), and, in one uninterruptible ("atomic") operation, verifies that the memory contains a first value, and if so, sets the memory word(s) to a second value. Hence, the compare-and-swap (CAS) operation may take the form:

CAS memory_address, expected_value→new_value
and may output one of two Boolean values: a Boolean true result, indicating that the memory address contained expected-value, and that the memory address has been set to new_value; or a Boolean false result, indicating that the memory address did not contain expected_value. The compare-and-swap operation thereby circumvents the scenario where a memory address did not contain expected_value, but still wrote the new value to the memory address. Moreover, the operations are performed together by the implementation layer (typically at the hardware level when executing machine code), and may not be interrupted by a thread that writes a new value to the memory address between the comparison and the setting.

The compare-and-swap operation may be utilized to reduce WAR hazards. In the third memory state 134 of FIG. 8, instead of simply writing the new value (0xFADE) to the system memory 32, thread A 28 may perform a compare-and-swap operation on the memory address. Because thread A 28 anticipates that the system memory 32 contains the value read during the first memory state 130—i.e., 0x0000—thread A 28 may verify that the system memory 32 still contains the anticipated value 0x0000 before writing the new value 0xFADE. Because of the intervention of thread B 30 in the second memory state 132, the system memory 32 does not contain this value, and the compare-and-swap operation performed by thread A 28 therefore returns a Boolean false result and does not overwrite the memory address with the value 0xFADE. Thread A 28 may respond to the failure of the compare-and-swap operation in many ways, such as by re-reading the memory address in the system memory 32 to retrieve the new value (0xFFFF) and attempting another compare-and-swap operation on the system memory 32. This configuration may result in a more desirable result, wherein thread A 28 writes the more recent value (0xFFFF) to the destination memory instead of the stale value (0x0000), resulting in a retention of the update to the object performed by thread B 30 as illustrated by the second memory state 132. The CAS operation as shown is just one example of an atomic operation that can be used to reduce WAR hazards. Another example atomic operation is a CAS operation that returns the value read. Yet another example is Load-Linked/Store-Conditional (LL/SC) operations, where the Load-Linked operation reads the value of a memory location and puts a marker on the memory location that will be removed by writes to the memory location, and where the Store-Conditional operation writes a value to a memory location under the condition that the marker on the memory location has not been removed. Those of ordinary skill in the art may be capable of utilizing many such atomic operations for operating on memory locations while implementing the techniques discussed herein.

Figure 9:
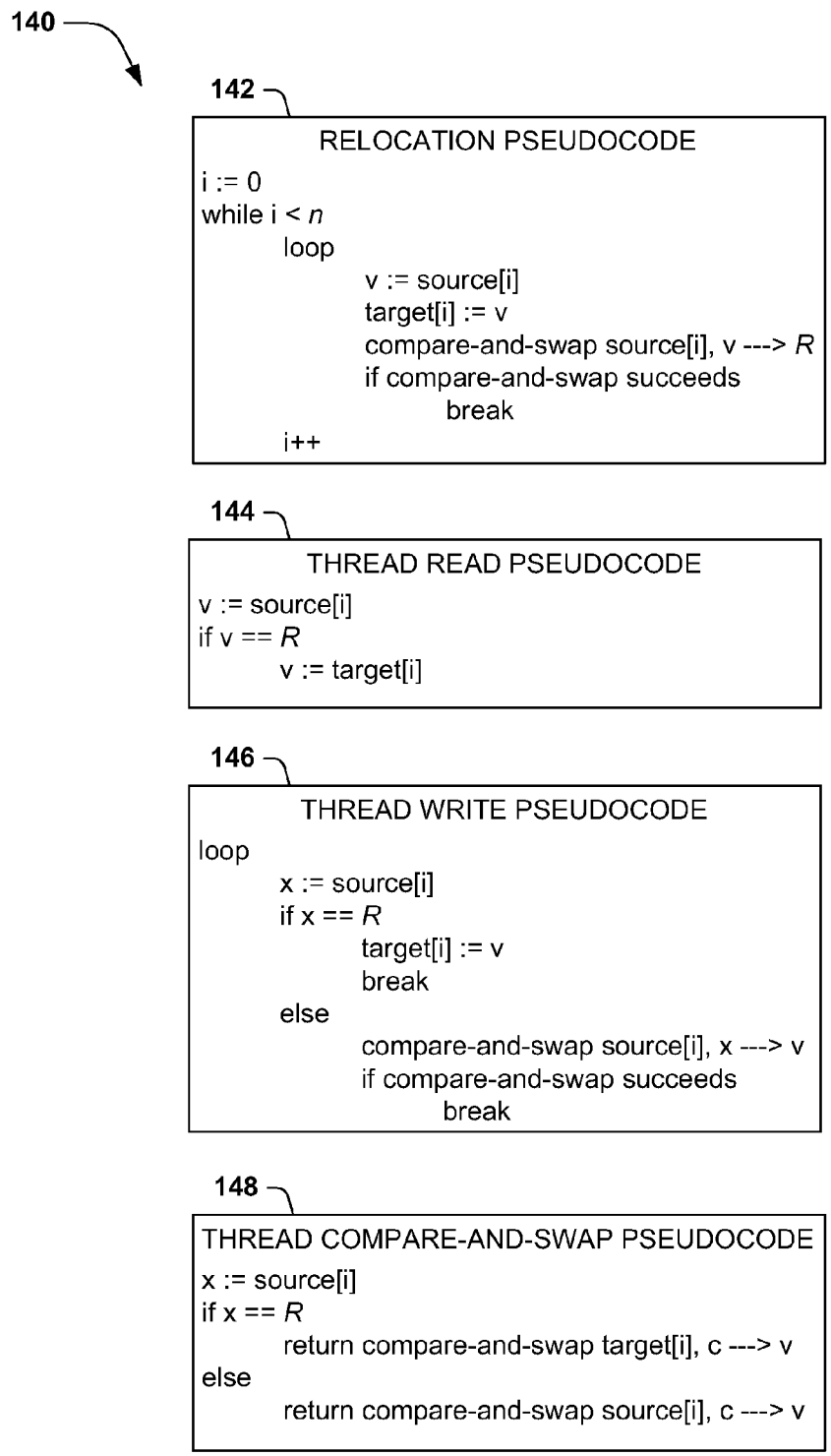
FIG. 9 is an illustration of a set of pseudocode comprising relocation-compliant functions for use during an object relocation.

In view of the utility of the compare-and-swap operation, FIG. 9 illustrates a set of pseudocode examples 140 for a few basic functions that may be incorporated in the relocation thread and the object referencing threads in furtherance of the techniques described herein. It will be appreciated that these pseudocode blocks are not limited to the syntactic or computing constraints of any particular computer language or system architecture. Rather, the pseudocode blocks are provided as a high-level representation of some logic that may comprise some functions compatible with the techniques illustrated herein. Also, in these and other examples discussed herein, the value R indicates the relocation value; the value n indicates the number of words comprising the object; and the notation "source[x]" and "target[x]" indicates the referencing of a word within the source memory or the target memory at word index x. Finally, the notation "compare-and-swap m[x], y→z" indicates the invocation of a compare-and-swap operation that verifies the value at word index x of memory m against the value y; if the comparison succeeds, the operation sets the same memory word to the value z and returns true, but if the comparison fails, the operation does not alter the memory word and returns false.

FIG. 9 illustrates an exemplary relocation pseudocode 142, which may achieve the relocation of an object in accordance with these techniques (such as may be embodied, e.g., in furtherance of the exemplary method 50 of FIG. 4 and/or the object relocation component 90 within the exemplary system 84 of FIG. 5.) The exemplary relocation pseudocode 142 iterates over the words of the object, copies each to the destination memory, and attempts to replace the word in the source memory with the relocation value. In this exemplary relocation pseudocode 142, the replacement is accomplished with a compare-and-swap operation, so that if a thread has changed the value prior to the compare-and-swap operation, the relocation will restart the relocation of the word. By verifying the constancy of the words in the source memory before replacing them with the relocation value, the exemplary relocation pseudocode 142 thereby achieves the relocation of the object while reducing write-after-read (WAR) hazards.

FIG. 9 also illustrates some exemplary pseudocode that may be utilized by threads in accessing an object during relocation. The exemplary pseudocode functions may serve as a platform upon which moderated access to the object may be performed, such that the threads may operate on the object without regard to the underlying circumstances of the object during its relocation. These functions may, e.g., be embodied in a runtime that hosts various threads, and may mediate the accessing of the object by the threads while implementing the functionalities described by this pseudocode.

The exemplary thread pseudocode of FIG. 9 is configured in the following manner. The exemplary thread read pseudocode 144 simply returns the current version of a requested word, whether located in the source memory or relocated to the destination memory. The exemplary thread write pseudocode 146, through which a thread may write a value to a word of the object, first determines whether the word is to be written to the source memory or the destination memory. Moreover, before writing to the source memory, the pseudocode verifies that the compare-and-swap value has not changed. If the value has not changed, the pseudocode writes the new word to the source memory and exits. If the value now comprises the relocation value, the compare-and-swap operation fails and the pseudocode reiterates, and in the next iteration the pseudocode writes to the destination memory. If the value has changed but does not comprise the relocation value, then the thread reiterates and will again attempt to write the word to the source memory. In this manner, the exemplary thread write pseudocode 146 attains write access to the word of the object in the appropriate location (i.e., the source memory or the destination memory) while utilizing a compare-and-swap operation to reduce write-after-read (WAR) hazards involving the overwriting of the relocation value. Moreover, the exemplary thread write pseudocode 146 iterates until a successful write is performed to either the source memory or the destination memory. The exemplary thread compare-and-swap pseudocode 148 provides a different functionality, wherein the write is performed against the current version of the word of the object (i.e., in the source memory or the destination memory), but verifies the current contents of the word against the value anticipated and supplied by the thread. Thus, in contrast with the exemplary write pseudocode 146, this function may return a spurious failure result, upon which the invoking thread may advantageously act; but this function precludes the unintentional overwriting of a changed word. This exemplary thread compare-and-swap pseudocode 148 operates as a wrapper function for the underlying (e.g., hardware-level) compare-and-swap operation, and adds the redirection of the compare-and-swap to the corresponding word of the destination memory if the word of the source memory contains the relocation value. Those of ordinary skill in the art may be able to devise many such operations upon an object during relocation, which may involve the use of synchronized operations such as compare-and-swap, while implementing the techniques presented herein.

A fourth aspect that may vary among implementations of these techniques relates to the manner of initiating the relocation of the object among the relocation thread and the object referencing threads. It may be appreciated that the thread pseudocode in FIG. 9 is more complicated than corresponding pseudocode for objects that are not being relocated, wherein words of the object may be accessed through a single read, write, or compare-and-swap operation. Therefore, the inclusion of the relocation information checking may create inefficiency and may reduce system performance, particularly if object relocation is infrequent. As an alternative to configuring the threads to include the relocation-sensitive aspects of the exemplary thread read pseudocode 144, the exemplary thread write pseudocode 146, and the exemplary thread compare-and-swap pseudocode 148 while accessing any object, the threads may instead be configured to utilize the relocation-sensitive pseudocode only for objects that are undergoing relocation, and to use the more simplified (e.g., single-instruction) operations for objects that are not being relocated. While the threads may check the relocation status of an object before using the object (e.g., by examining a relocation status indicator stored in an object header of the object as in FIG. 6, or by inquiring with a relocation thread that is configured to store relocation information as in FIG. 7), such polling may be inefficient.

As one example for configuring the threads to utilize relocation-sensitive functions selectively for objects undergoing relocation, the relocation thread may, in various ways, notify the threads of an imminent relocation of a particular object. Moreover, the relocation thread may achieve this notification, and an acknowledgment thereof, from each thread prior to commencing the object relocation. The threads may be concomitantly configured to receive such requests for relocation acknowledgments for an object, to provide a relocation acknowledgment for the object, and to utilize the relocation-specific functions (such as the exemplary pseuducode functions of FIG. 9) only for the objects for which the thread has received a request for a relocation acknowledgment. This checking may continue until, e.g., the thread detects or is notified that the object has been successfully relocated. For other objects, the thread may utilize more efficient functions that do not check for relocation conditions.

In opting to provide the relocation acknowledgment, the threads may be configured to determine whether or not the code that the thread is executing comprises a safe point for the specified object. If the thread does not contain a reference to the object, then the thread may simply provide the relocation acknowledgment, as the entirety of the code comprising the thread comprises a safe point for the object. If the thread does contain at least one reference to the object, then the thread may further determine whether the instruction pointer for the thread is in the middle of a code section comprising a compound operation on the object that may be complicated by a relocation, e.g., a combined read, check, and modification of a field of the object, which may comprise a write-after-read (WAR) hazard. If such a compound operation is occurring, the thread may delay providing the relocation acknowledgment until the compound operation is complete; but if the thread is not currently utilizing the object in such a manner, then the thread may conclude the code currently executed by the thread comprises a safe point for the object, and may promptly provide the relocation acknowledgment. In this manner, an object referencing thread may cooperate with the object relocation thread in determining when to relocate the object, and may perform the checking of the relocation status indicator only of objects that the thread has acknowledged are to be relocated.

Figure 10:
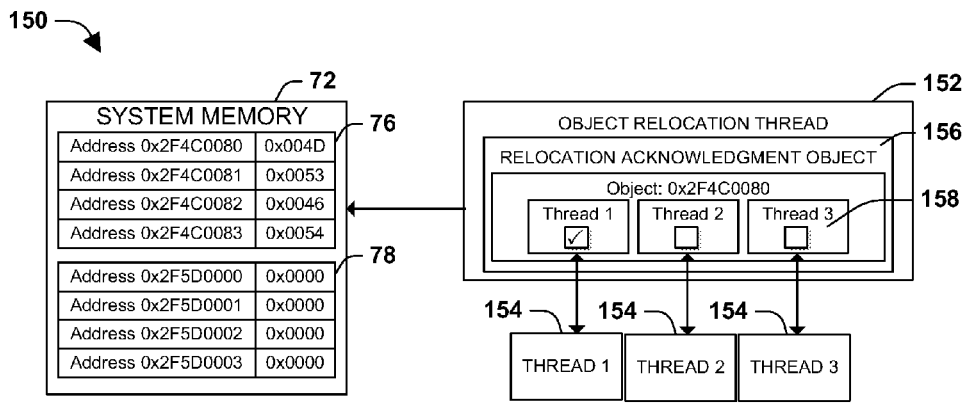
FIG. 10 is a component block diagram illustrating a portion of an exemplary object relocation system comprising a relocation acknowledgment object.

FIG. 10 presents an exemplary embodiment 150 of these techniques that includes the requesting and providing of relocation acknowledgments by the threads. The exemplary embodiment 150 illustrates an object stored in system memory 72 that is targeted for relocation from a source memory 76 to a target memory 78 by an object relocation thread 152 that may be modified by at least one object referencing thread 154. In this exemplary embodiment 150, the object relocation thread 152 is configured to initiate the relocation by initializing a relocation acknowledgment object 156, which may specify the object to be relocated (e.g., according to the address of the source memory 76) and comprises a relocation acknowledgment flag 158 for each object referencing thread 154. The object relocation thread 152 may also request the object referencing threads 154 to set the respective relocation acknowledgment flag 158 in the relocation acknowledgment object 156 upon occupying a relocation safe point for the object. Alternatively, the object relocation thread 152 may simply initialize the relocation acknowledgment object 156, and the object referencing threads 154 may be configured to poll the object relocation thread 152 to detect the generation of a relocation acknowledgment object 156. In either scenario, the at least one object referencing thread 154 may respond to the relocation acknowledgment request by determining whether the object referencing thread 154 occupies a relocation safe point for the object, and each object referencing thread 154 may set its respective relocation acknowledgment flag 158 within the relocation acknowledgment object 156 upon reaching such a safe point. The object relocation thread 152 may therefore await the setting of all flags in the relocation acknowledgment object 156 for an object before proceeding with the relocation. Those of ordinary skill in the art may be able to devise many variations in the requesting and receiving of acknowledgments of an object relocation among the object relocation thread and the object referencing threads while implementing the techniques discussed herein.

Figure 11:
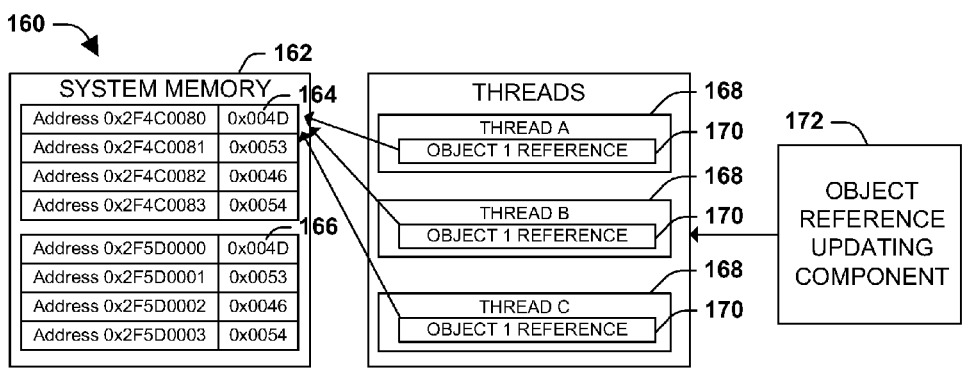
FIG. 11 is an illustration of an exemplary object reference updating operation following a successful object relocation.
Figure 12:
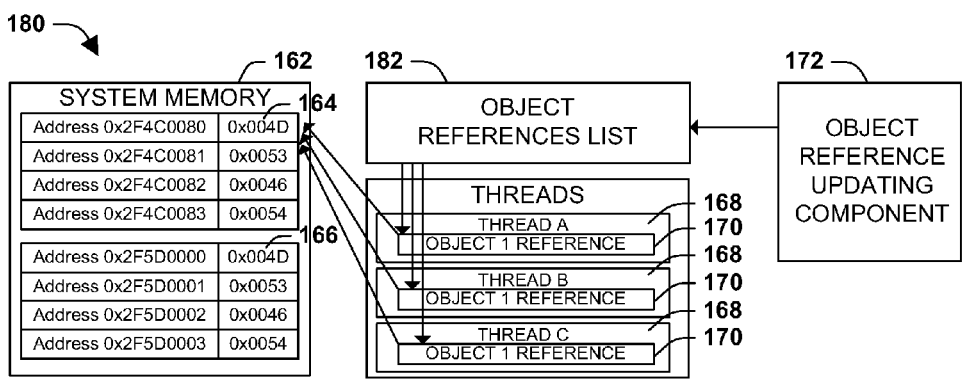
FIG. 12 is an illustration of another exemplary object reference updating operation following a successful object relocation.
Figure 13:
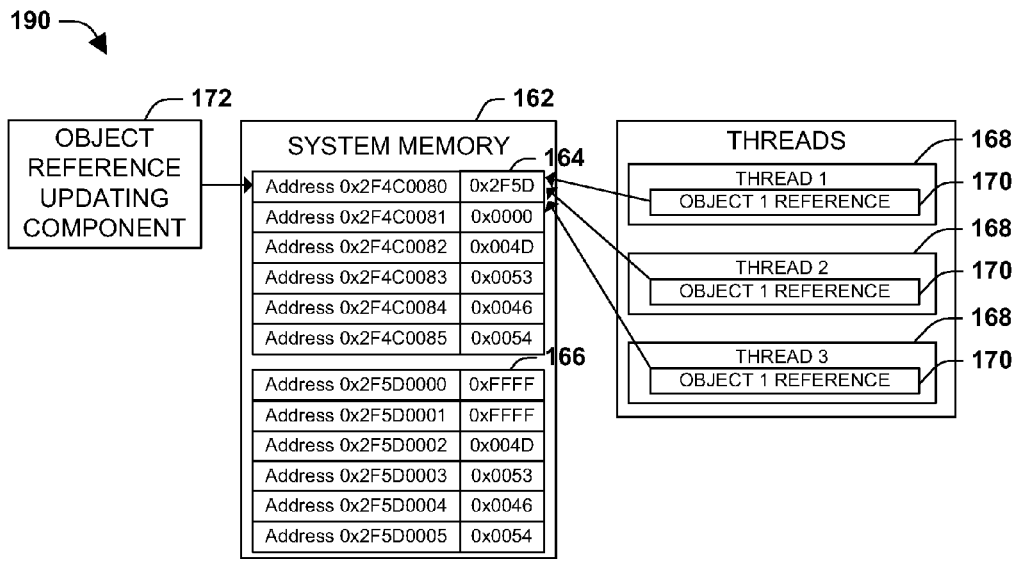
FIG. 13 is an illustration of yet another exemplary object reference updating operation following a successful object relocation.

A fifth aspect that may vary among implementations of these techniques relates to the updating of references after the copying. The relocation of the object is not complete until the references to the object are changed from the address of the source memory to the address of the destination memory. FIGS. 11, 12, and 13 present some techniques for accomplishing the updating of references in accordance with this aspect. Each example illustrates a system memory 162 comprising an object stored at a source memory 164 and targeted for relocation to a destination memory 166, which is utilized by various object referencing threads 168 having object references 170 associated with the source memory 164. The illustrated examples also complete the updating through an object reference updating component 172, which may, e.g., be included in systems for relocating such objects, such as the exemplary system 84 of FIG. 5.

FIG. 11 illustrates a first embodiment 160 of an object reference updating component 172, wherein the computer system endeavors to locate all references to a relocated object on an ad hoc basis, e.g., by scanning the stack and heap spaces of all threads to identify words matching the address of the source memory, and are likely used as references to the object. Accordingly, the object reference updating component 172 may, through scanning, update the object references 170 in the entire system, including within the object referencing threads 168, to point to the destination memory 166 following a successful copying of the object. However, if many object referencing threads 168 exist or if memory utilization is large, the scanning may take a long time.

FIG. 12 illustrates a second embodiment 180 of an object reference updating component 172, wherein the computer system maintains an object references list 182 that indexes the object references 170 in the entire system, including within various object referencing threads 168, to an object in the system memory. When an object referencing thread 168 creates or updates an object reference 170, the computer system (e.g., a runtime configured to service the thread) may automatically insert a reference to the object reference 170 into the object references list 182. As a result, the object references list 182 contains a record of the object references 170 to each object. For instance, the object references list 182 may contain a record referencing the source memory 164 for the object, and also the memory addresses of the object references 170 in various object referencing threads 168 that currently point to the source memory 164. Upon detecting a completed copy of the object targeted for relocation in the absence of any detected object modifications, the object reference updating component 172 may consult the object references list 182 to retrieve an index of the object references 170 to the object that are to be updated to point to the destination memory 166. Although the generation and maintenance of the object references list 182 may consume system resources, the object reference updating component 172 may utilize the object references list 182 to accomplish the updating of the references in a quicker manner than the scanning technique illustrated in FIG. 11.

As an alternative to proactively updating the object references, the computer system may be devised to configure the threads to maintain the references to various objects with support for relocation. In a third embodiment (not illustrated), an object reference updating component may notify each thread of the relocation of an object, and each object referencing thread may endeavor to update the object references to reference the destination memory. One technique for implementing the notification involves initializing a thread interrupt for the object referencing threads, wherein the interrupt redirects the object referencing thread to an object reference updating function configured to update the references to the relocated object within the thread. While this technique may quickly achieve the updating of the references to a relocated object, the generation of such interrupts may impose a system performance penalty due to the abrupt context switches of the various threads to and from the object reference updating function. Moreover, this system performance penalty may be largely unproductive if only a small percentage of the threads contain a reference to the relocated object.

FIG. 13 presents a fourth embodiment 190 of an object reference updating component 172, wherein the relocation address of an object is included in an object header associated with the object. If the object has not been relocated, the relocation address in the object header may be set to a magic number (e.g., 0xFFFFFFFF or 0x00000000), or may be set to the current address of the object; for instance, the version of the object at the destination memory 166 in FIG. 13 may have its relocation address set to 0x2F5D0000. In this exemplary embodiment, the object referencing threads 168 contain object references 170 that point to the object header at the top of the source memory. Upon interacting with the object, the object referencing threads 168 examine the object header to determine if the object has been relocated; if so, the threads are configured to access the destination memory rather than the source memory. The object referencing threads 168 threads may further be configured to update the object references 170 contained therein to the destination memory 166 indicated in the object header. This configuration may present an advantage of effectively enforcing a change of all object references 170 with one memory update by the object reference updating component 172; while no object references 170 are changed at the instant of the relocation address write, the configuration of the object referencing threads 168 promotes the use of the proper memory block and possibly also the updating of the object references 170 before the next memory access by the thread 168 to the object. This embodiment may provide an advantage of conserving system performance by avoiding a mass update of all object reference 168. Those of ordinary skill in the art may be able to devise many variations of these and other aspects of the updating of object references while implementing the techniques discussed herein.

An additional variation of the fourth embodiment 190 of this aspect involves the manner of configuring the object referencing threads to update references based on the checking of the relocation address of the object. As one variation, the object referencing threads may be configured to check the relocation address upon each access of the object, e.g., upon following a reference to the object. However, because many objects may be frequently utilized by a thread, the thread may spend a nontrivial amount of time checking relocation addresses of various object, which may be unproductive if the objects are infrequently relocated. Thus, it may be inefficient to configure the threads to check the relocation address each time an object is accessed.

As an alternative variation of the fourth embodiment 190 of this aspect, it may be acceptable for an object referencing thread to delay the checking of the relocation address for an object, and to continue using an obsolete version of the object at the source memory even if the object is relocated to a destination memory. For instance, the object referencing thread may perform various read operations on the object that may not significantly depend on the most recent version of the object. In this delayed checking variation, the thread may be prompted to update its references upon various events. For instance, the computer system may occasionally prompt the object referencing threads to update the references contained therein, e.g., so that a garbage collection cycle may run and reclaim the unused versions of the object.

The object referencing thread may also be configured to delay the updating until it is about to perform an operation that should utilize a more recent version of the object, such as a relocated version, if one exists. For instance, the object referencing thread may be about to write to an object, and may endeavor to update its reference to the object just prior to writing, so that the write is directed to the most current version of the object and the written data will be preserved. Moreover, upon opting to update its reference to an object (e.g., prior to writing), the object referencing thread may be configured to update its references to all objects managed by the object referencing thread; this may be advantageous in promoting the updating of references even to object referencing objects that are infrequently or never used in ways that prompt the object referencing thread to update its references to the object (e.g., read-only objects.) Accordingly, respective object referencing threads may be configured to update the object references within the thread before writing to an object referenced within the thread. While delaying the updating of references may cause the computer system to forestall the reclamation of the memory used by the obsolete version of the object in the source memory, and may therefore prolong operations that involve such reclamation (e.g., memory compaction), the computer system may exhibit improved system performance by significantly reducing the frequency of checking the relocation addresses. Many variations in the configuration of threads in checking the relocation addresses of objects may be devised by those of ordinary skill in the art in accordance with the techniques discussed herein.

A sixth aspect that may vary among implementations of these techniques relates to some safety measures that may be implemented to safeguard the relocation against particular scenarios that may cause problems during the object relocation. The scenarios related herein involve some unusual circumstances with respect to a presence of the relocation value in the object outside of its semantic use for the relocation process. As noted in the first aspect of these embodiments, the relocation value used within these techniques may be devised of a suitably long word length (e.g., 64 bits) that the value is highly unlikely to appear in the object except as a relocation value. While these techniques may be applied in such a manner as to reduce the odds of this occurrence to nearly zero, the consequences of such an occurrence may cause significant problems, such as the unintended alteration of the object during relocation, the overwriting of updates written to the object, or the misdirection of a reference to an unknown location. The results of these errors may cause data corruption or memory access exceptions that cause programs or the operating system to crash.

It may be feasible to disregard such scenarios and rely on the very high probabilities to avoid these occurrences, or to render them even more improbable, such as by using even longer bit-length relocation values. It might be advantageous to disregard some or all of these scenarios because the safety measures may consume some additional computing resources, such as processor cycles and memory access monitoring operations, which may reduce the efficiency of the computer system. Moreover, some of these safety measures involve blocking a thread for a certain period, which may not be an acceptable option in some systems, such as in realtime operating systems involving tasks with hard deadlines. However, the utilization of these techniques promotes the correct performance of the relocation and avoids incorrect program behavior that may be caused by these scenarios. Hence, the decision of whether or not to include a safety measure may lead to a choice between a relocation technique that is more efficient and lock-free but possibly incorrect, and a relocation technique that is correct but less efficient and possibly involves a thread block. The latter option may be more appealing in light of the high improbability that such measures will be invoked, since the blocking of a thread only arises in the very unlikely event of the presence of the relocation value in the object outside of its semantic indication in the relocation. Hence, while embodiments of these techniques including the safety measures are not literally lock-free, such embodiments are probabilistically lock-free, i.e., lock-free except in the highly improbable scenarios described herein. This improbable locking may be acceptable in view of the alternative outcome in the same scenario of not locking the threads but producing an unintended mutation of the object.

Figure 14:
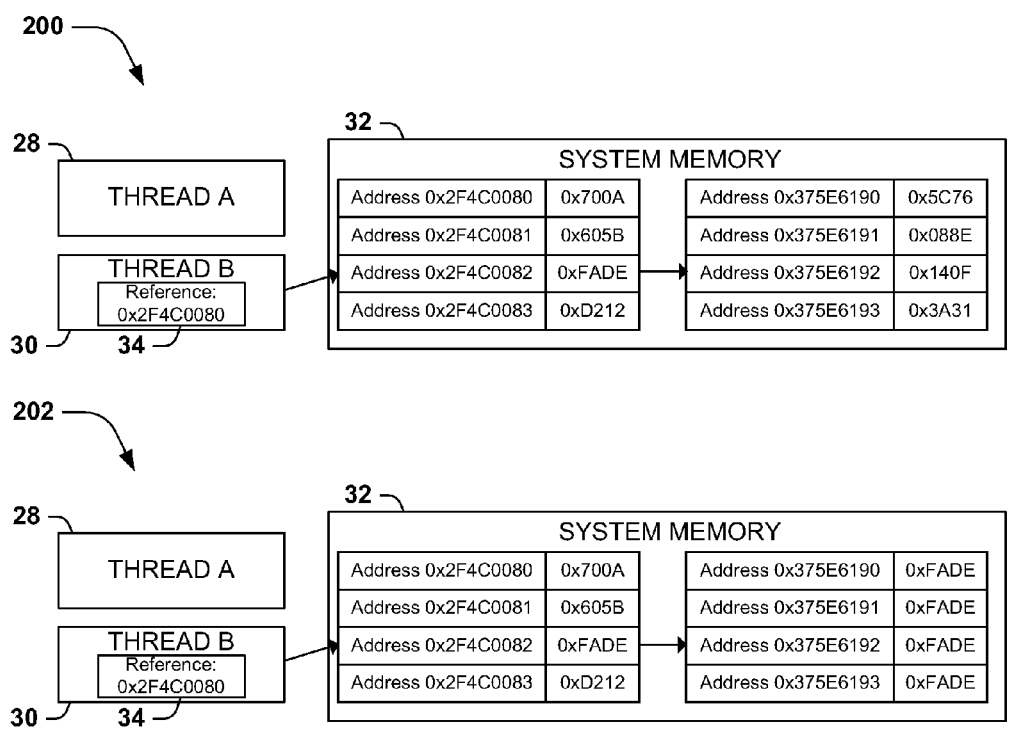
FIG. 14 is an illustration of another set of memory states depicting an interaction of threads with a system memory involving a lost object update.

FIG. 14 presents a first scenario that may cause problems during an object relocation, as illustrated in a first memory state 200. In this and the other scenarios presented herein, thread A 28 represents an object relocation thread configured to relocate an object stored in the system memory 32 from a source memory at address 0x2F4C0080 to a destination memory at address 0x375E6190, using an object relocation value 0xFADE, while thread B 30 represents an object referencing thread containing an object reference 34. In the first scenario illustrated in FIG. 14, a problem arises because the relocation value 0xFADE may already be present in the object at address 0x2F4C0082. This scenario may also arise if an object referencing thread happens to write the object relocation value (in this case, 0xFADE) to a word of the object in the source memory before thread A 28 begins relocating the word to the destination memory. As a result of these improbable but not impossible scenarios, thread B 30 may access this word of the object during relocation, and may be redirected to the corresponding word of the destination memory, which may be uninitialized and may contain a random value. As a result, thread B 30 receives an incorrect value while attempting to access the word of the object, causing incorrect and possibly exception-raising program behavior.

FIG. 14 also presents a safety measure for avoiding this scenario, as illustrated in the alternative memory state 202. According to this safety measure, thread A 28 may be configured, before initiating the object copying, to set the words of the destination memory to the relocation value. In this example, after choosing the relocation value 0xFADE but before initiating the copying (and, if included in the embodiment, before requesting relocation acknowledgments for the object from the object referencing threads such as thread B 30), thread A 28 may initialize the words of the destination memory with the relocation value 0xFADE. As a result of this initialization, the coincidental presence of the relocation value in the source memory, or the coincidental writing of the relocation value to the source memory outside of its intended semantic for the object relocation, results in a redirection of the word to the corresponding word of the destination memory, which now contains the same value 0xFADE.

Figure 15:
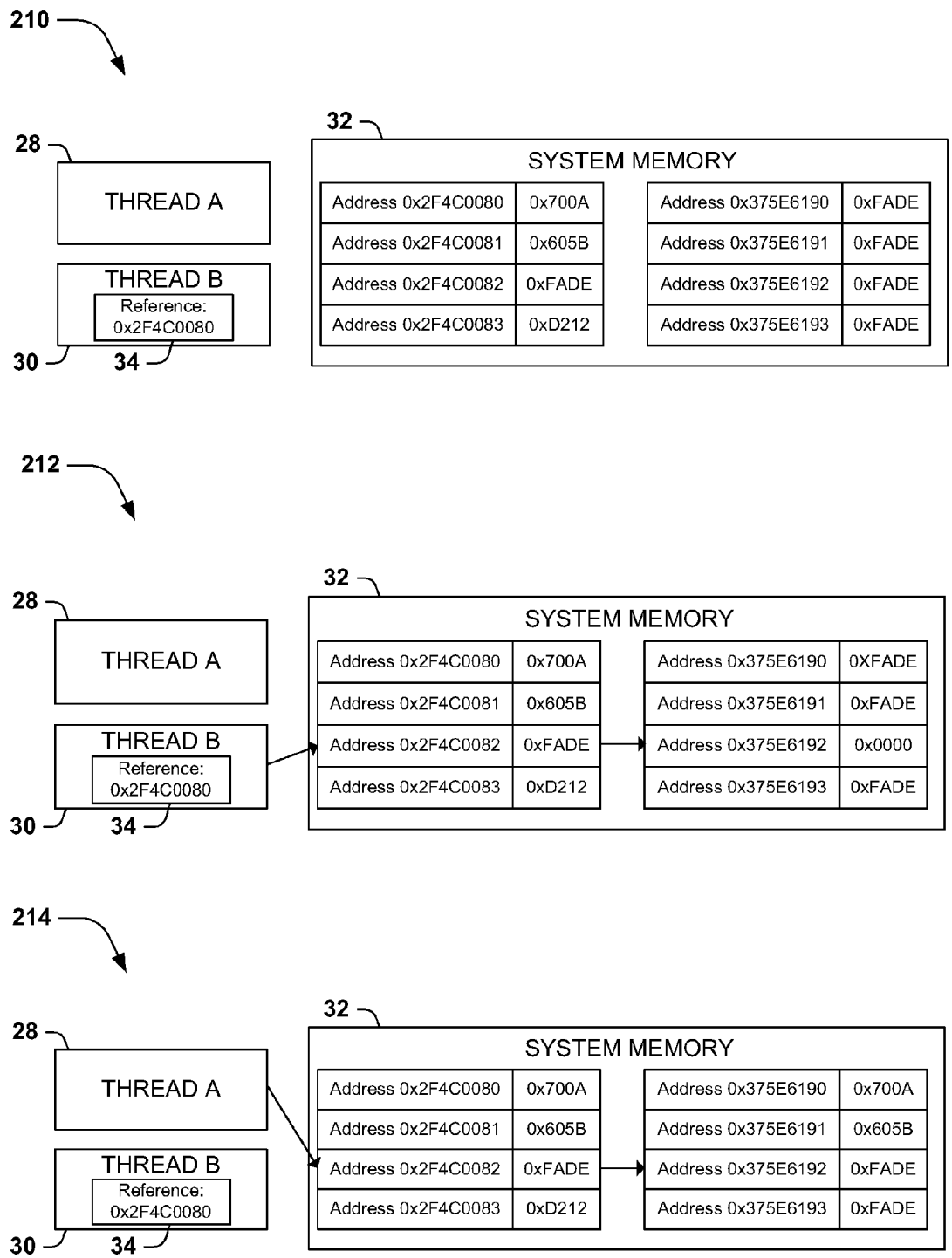
FIG. 15 is an illustration of yet another set of memory states depicting an interaction of threads with a system memory involving a lost object update.

This safety measure involves an additional complication involving the object relocation thread, as illustrated in FIG. 15. In this scenario, thread A 28 is relocating the object to from the source memory to the destination memory with the relocation value 0xFADE. As illustrated in the first memory state 210 (which may represent the state of the system memory 32 upon commencing the copying), the object happens to contain value 0xFADE in the source memory at address 0x2F4C0082, but because thread A 28 has initialized the words of the destination memory to 0xFADE prior to initiating the copying of the object, this is not problematic. However, as illustrated in the second memory state 212, after thread A 28 has begun relocating the object (e.g., while awaiting relocation acknowledgments from the threads, or while relocating lower-addressed words of the object in the source memory), thread B 30 happens to write a new value, 0x000, to the object representation at offset 2, which in the source memory block corresponds to address 0x2F4C0082. Because thread B 30 is cognizant of the relocation of the object, and may (e.g.) access the system memory 32 using a write function based on the exemplary thread write pseudocode 146 of FIG. 9, thread B 30 correctly writes the new value to the corresponding word of the destination memory at address 0x375E6192. Again, this is not problematic, because any references to the object by thread B 30 or other threads will read the new value 0x0000 from the correct address in the destination memory. However, a problem arises if thread A 28 is configured to relocate the words of the object according to the exemplary relocation pseudocode 142 of FIG. 9. As illustrated in the third memory state 214, when thread A 28 reaches this word of the source memory, it performs the relocation by copying the word over to the destination memory—which thereby replaces the value 0x0000 written by thread B 30. As a result, the relocation value copies a relocation value preexisting in the source memory over a newly updated value in the destination memory. From the perspective of the object referencing threads, such as thread B 30, the object spontaneously reverts to an earlier state having the relocation value, and the update to the object is lost.

The scenario illustrated in FIG. 15 may be avoided by modifying the relocation thread, such as the relocation pseudocode 142 of FIG. 9. The modification involves configuring the relocation thread to copy a word from the source memory to the destination memory only if it does not comprise the relocation value, such as by inserting this logic into the pseudocode before the compare-and-swap operation:

if v=R then
  break

This operation therefore omits the copying of the word to safeguard against the updating of the corresponding word in the destination memory by another thread, as illustrated in FIG. 15. On the other hand, if the word has not been updated and still contains the relocation value, because the destination memory has been initialized with the relocation value, the copying can be omitted.

Figure 16:
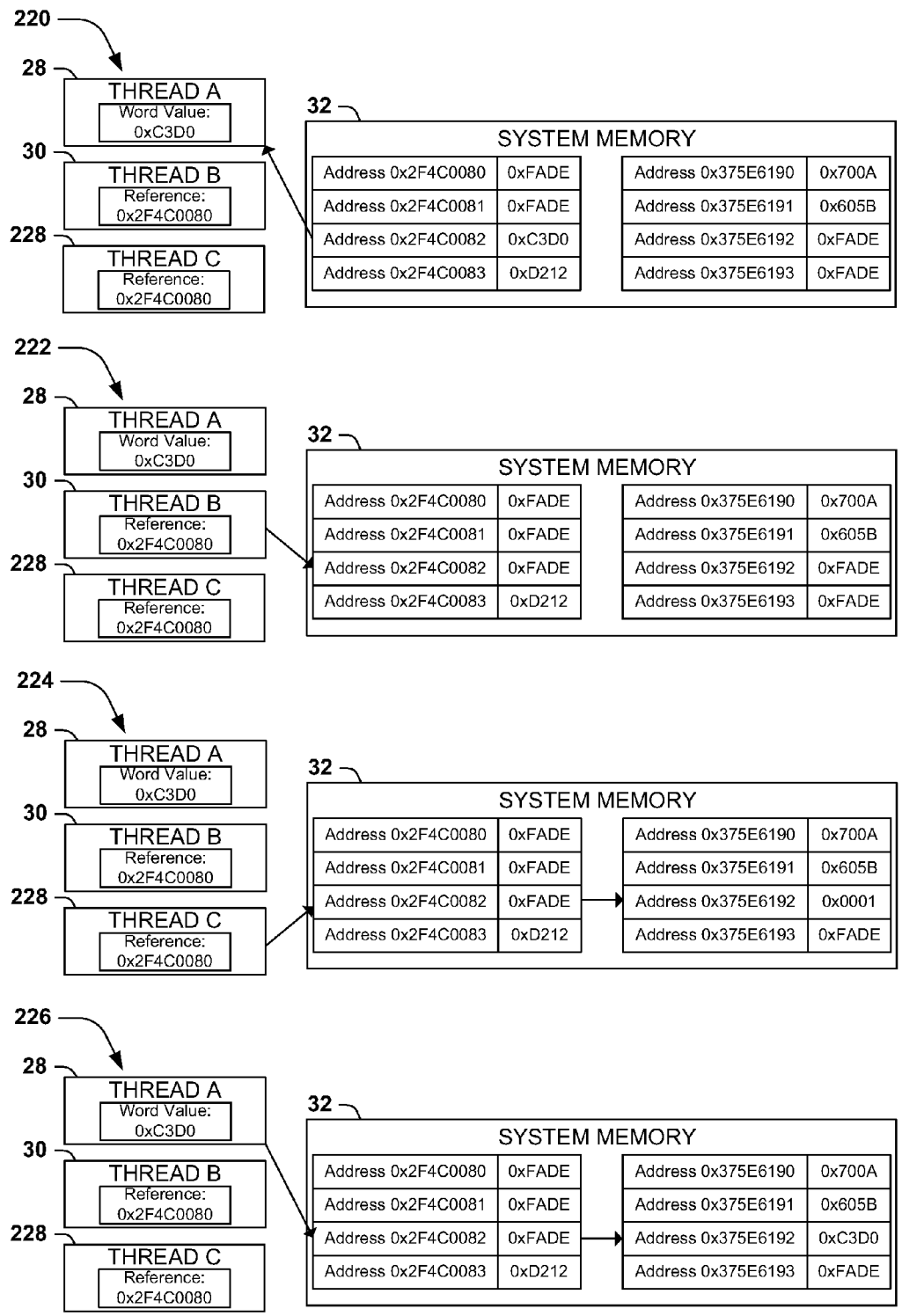
FIG. 16 is an illustration of yet another set of memory states depicting an interaction of threads with a system memory involving a lost object update.

FIG. 16 illustrates a second scenario that may arise during the object relocation, wherein a thread that writes the relocation value to the source memory may cause a loss of updates to the object due to a write-after-read (WAR) hazard in the operation of the relocation thread. This scenario involves the operation of a second object referencing thread, identified as thread C 228, which operates in an interleaved and/or concurrent fashion with thread A 28 and thread B 30. This scenario begins with a first memory state 220, wherein thread A 28, in relocating the word of the object in the source memory at address 0x2F4C0082, reads the current value of the word 0xC3D0.) Before thread A 28 can proceed with the relocation, thread B 30 is permitted to run, and thread B 30 takes the action of writing a relocation value to the object at the same address of the source object, 0x2F4C0082. Thread B 30 is cognizant of the relocation of the object (e.g., thread B 30 may be using the exemplary thread write pseudocode 146 of FIG. 9), and therefore compares the contents of the source memory word to the relocation value to determine if it has been relocated by thread A 28. Because the contents of the source memory word does not equal the relocation value, thread B 30 therefore writes a new value to the object, resulting in the second memory state 222. The value that thread B 30 writes to the object is the relocation value 0xFADE, but according to the techniques presented in FIGS. 14-15, this does not yet create a problem.

As further illustrated in FIG. 16, thread C 228 next accesses the same word of the object, and updates the same word of the object. Because thread C 228 is also cognizant of the relocation of the object, it first checks the value of the word in the source memory, determines that it equals the relocation value, and writes its new value (0x0001) to the corresponding word of the destination memory at address 0x375E6192, resulting in the third memory state 224. However, because of this sequence of events, a problem arises when thread A 28 next runs; pursuant to the exemplary relocation pseudocode 142 of FIG. 9, thread A 28 proceeds to overwrite the value in the destination memory with the word 0xC3D0, which was read from the source memory in the first memory state 220, resulting in the fourth memory state 226. As a result of this overwriting, the object appears to revert to a previous state, having spontaneously lost the previous two updates to the word. In continuing with the exemplary relocation pseudocode 142, thread A 28 subsequently compare-and-swaps the word of the source memory against the read value (0xC3D0), and finding a failure, thread A 28 then restarts the relocation of the word; regardless of its results, the most recent update to the object (value 0x0001, written by thread C 228) is lost.

The scenario illustrated in FIG. 16 arises because an object relocation thread is permitted to write the relocation value to the source memory during the relocation of the object. In some conditions, this may not be problematic; as illustrated in the second memory state 202 of FIG. 14, if the destination memory is initialized to the relocation value and the relocation thread has not yet begun relocating the word, the thread may write the relocation value to the word in the source memory without incident. However, in other conditions, the problem illustrated in FIG. 16 arises, and results in a loss of data. One solution to this problem involves monitoring the threads to detect a writing of the relocation value in a word of the object in the source memory by a writing thread during the copying, and upon detecting the writing of the relocation value, blocking the writing thread until the copying is complete. Once the copying is complete, the writing thread may be allowed to resume, and may (e.g.) have its write denied, redirected to the corresponding word of the destination memory, etc. While the blocking of threads may be undesirable, and may be detrimental in some computing environments (such as realtime operating systems having hard deadlines), the high improbability of the scenario illustrated in FIG. 16—wherein a thread happens to choose to write a relocation value to the source memory, and a second thread writes to the same address, in the midst of a relocation of the word—may mitigate the disadvantages of this safety measure.

Figure 17:
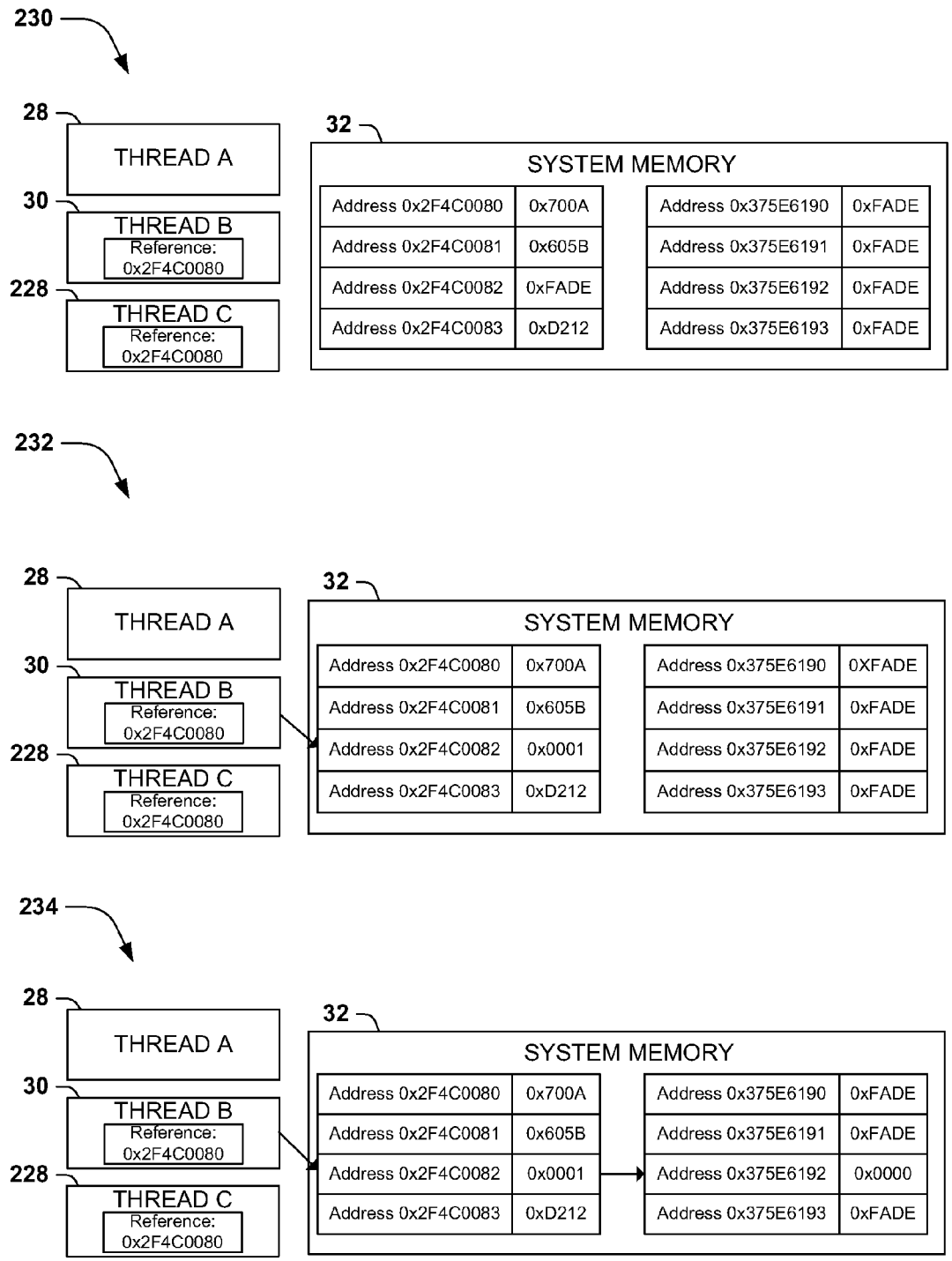
FIG. 17 is an illustration of yet another set of memory states depicting an interaction of threads with a system memory involving a lost object update.

FIG. 17 illustrates a third scenario where an update of the object involving a relocation value may lead to a problem. This scenario pertains to the initiation of the relocation involving relocation acknowledgments, such as illustrated in FIG. 10, wherein some threads are cognizant of the relocation of the object, while others may not yet be cognizant of the relocation of the object. The scenario presented in FIG. 17 relates to presence of a relocation value in the object in the source memory at address 0x2F4C0082. In the first memory state 230, thread A 28 has prepared to relocate the object by initializing the destination memory to the relocation word 0xFADE, and is initializing a relocation acknowledgment object (such as the relocation acknowledgment object 156 of FIG. 10) to coordinate the acknowledgment of the relocation of the object among the threads. In this scenario, thread B 30 has acknowledged the relocation of the object, and is using relocation-safe functions for accessing the object, such as illustrated in FIG. 9. Accordingly, in the first memory state 230, thread B begins to write a new value (e.g., 0x0000) to the object by first checking the value of the source word; and, finding that the source word comprises the relocation value, endeavors to write its value to the destination memory. However, before thread B writes its value to the destination memory, thread C 228 is permitted to run.

Continuing with the scenario illustrated in FIG. 17, thread C 228 endeavors to write to the object, but thread C 228 may not yet have acknowledged the relocation, and may not be using relocation-safe functions. Accordingly, thread C 228 neither recognizes the semantic of the relocation value 0xFADE nor checks for its presence in the source memory; and when thread C 228 writes a new value (e.g., 0x0001) to the object at address 0x2F4C0082, the write is performed in the source memory, overwriting the relocation value. This write is illustrated in the second memory state 232, which does not yet indicate a problem, since the version of the object in the source memory is still current. However, a problem arises when thread B 30 continues with its updating of the object by writing its value (0x0000) to the destination memory, producing the third memory state 234. The problem becomes apparent when thread B 30 or thread C 228 reads the current value of the word in the object as 0x0001; although the write by thread B 30 followed the write by thread C 228, thread B's update is not visible due to the overwriting of the relocation value. Moreover, when thread A 28 subsequently relocates the words of the object in the source memory, the value written by thread B 30 to the destination memory is overwritten with the value written by thread C 228.

The problem arising in the scenario illustrated in FIG. 17 arises because a thread is permitted to overwrite a relocation value in the source memory. This overwriting does not arise in threads that have already acknowledged the relocation, which check the value of the word in the source memory and to direct read, write, and compare-and-swap operations to the destination memory where the word in the source memory comprises the relocation value. However, the overwriting may occur in threads that have not yet acknowledged the relocation of the object, and that are not using relocation-safe functions. One solution to this problem involves monitoring the threads to detect an overwriting of a relocation value in a word of the object in the source memory while awaiting the relocation acknowledgments from the threads. Thus, as long as at least one thread has not yet acknowledged the relocation of the object, the computer system may monitor memory accesses to detect any write to the source memory that happens to overwrite a relocation value. Upon detecting the overwriting of the relocation value, the computer system may prevent the overwriting by negating the write operation. The computer system may then continue the operation of the thread, and may notify the thread of the prevented write, through various mechanisms. As one example, the computer system may simply negate the overwriting operation, and may return a failure indicator or an exception for the overwriting thread. However, the overwriting thread may be permitted to retry the write in the event of a failure, which may lead to a second denied write, etc. Moreover, if such monitoring, preventing, and exception-raising consume computing resources, such as CPU cycles, the computer system may have fewer resources to allocate for making progress within the threads for providing relocation acknowledgments, so a gridlock problem may arise due to the repeated write attempts and denials.

Another solution for the problem arising in the scenario illustrated in FIG. 17 involves detecting the overwriting of a relocation value while relocation acknowledgments are pending, and upon detecting an overwriting of a relocation value, generating a relocation acknowledgment, and blocking the overwriting thread until the relocation acknowledgments have been received from all of the threads. Upon receiving these remaining relocation acknowledgments, the computer system may unblock the overwriting thread. Again, while the blocking of threads may be undesirable, the high improbability of the scenario illustrated in FIG. 17 may mitigate the disadvantages of this safety measure. Those of ordinary skill in the art may be able to devise other safety measures for avoiding the scenarios illustrated in FIGS. 14-17 while implementing the techniques presented herein.

The solutions to some of these problems may be achieved by adjusting the functions of the threads, such as the exemplary pseudocode presented in FIG. 9. FIG. 18 presents an exemplary set 240 of pseudocode for functions that implements some of the safety measures discussed herein, wherein the threads are configured to block upon attempting to overwrite a word in the source memory comprising a relocation value, or upon attempting to write the relocation value to the source memory during the copying. An exemplary thread write pseudocode 242 is presented that, in comparison with the exemplary thread write pseudocode 146 of FIG. 9, includes two additional features. First, if finding the relocation value in source memory, the pseudocode detects whether relocation acknowledgments are pending. If so, the pseudocode blocks until the relocation acknowledgments have been received, and then begins the loop again. Second, if the pseudocode detects a write of a relocation value to a word that has not yet been relocated, the pseudocode blocks until the copying is complete, then begins the loop again, which writes the relocation value to the destination memory. By including these two blocking features, the exemplary thread write pseudocode 242 of FIG. 17 implements measures to safeguard against the scenarios illustrated in FIGS. 16 and 17.

FIG. 18 also presents an exemplary thread compare-and-swap pseudocode 244 that, in comparison with the exemplary thread compare-and-swap pseudocode 148 of FIG. 9, includes three features. First, as in the exemplary thread write pseudocode 242, the exemplary thread compare-and-swap pseudocode 244 is sensitive to attempts to overwrite relocation values in source memory during the pendency of relocation acknowledgments, and will block until the acknowledgments have been received and then return false. Second, before writing to the source memory, the pseudocode checks the value to be written to determine if it is the relocation value; if so, the pseudocode blocks until the relocation is complete. Third, before performing the compare-and-swap against the source memory, the pseudocode checks the comparand against the relocation value to ensure that the compare-and-swap does not write a relocation value to source memory during object relocation. Those of ordinary skill in the art may be able to devise other techniques for including these and other safety checks in the configuration of the threads while implementing the techniques discussed herein.

In view of the foregoing techniques, a method may be devised for relocating to a destination memory an object represented by a source memory and referenced by at least one reference, where respective references are managed by a thread, which may implement several of the variations of particular aspects in order to achieve various advantages and/or reduce disadvantages as discussed herein. An exemplary method 250 of this nature is presented in FIG. 19, which operates within an operating environment comprising at least one object referencing thread. The threads in this computing environment are configured to access the words of the object in the destination memory during the relocation where corresponding words in the source memory contain the relocation value. The threads are also configured to write to words of the object in the source memory through a compare-and-swap operation verifying that the word in the source memory does not contain the relocation value.

Figure 19:
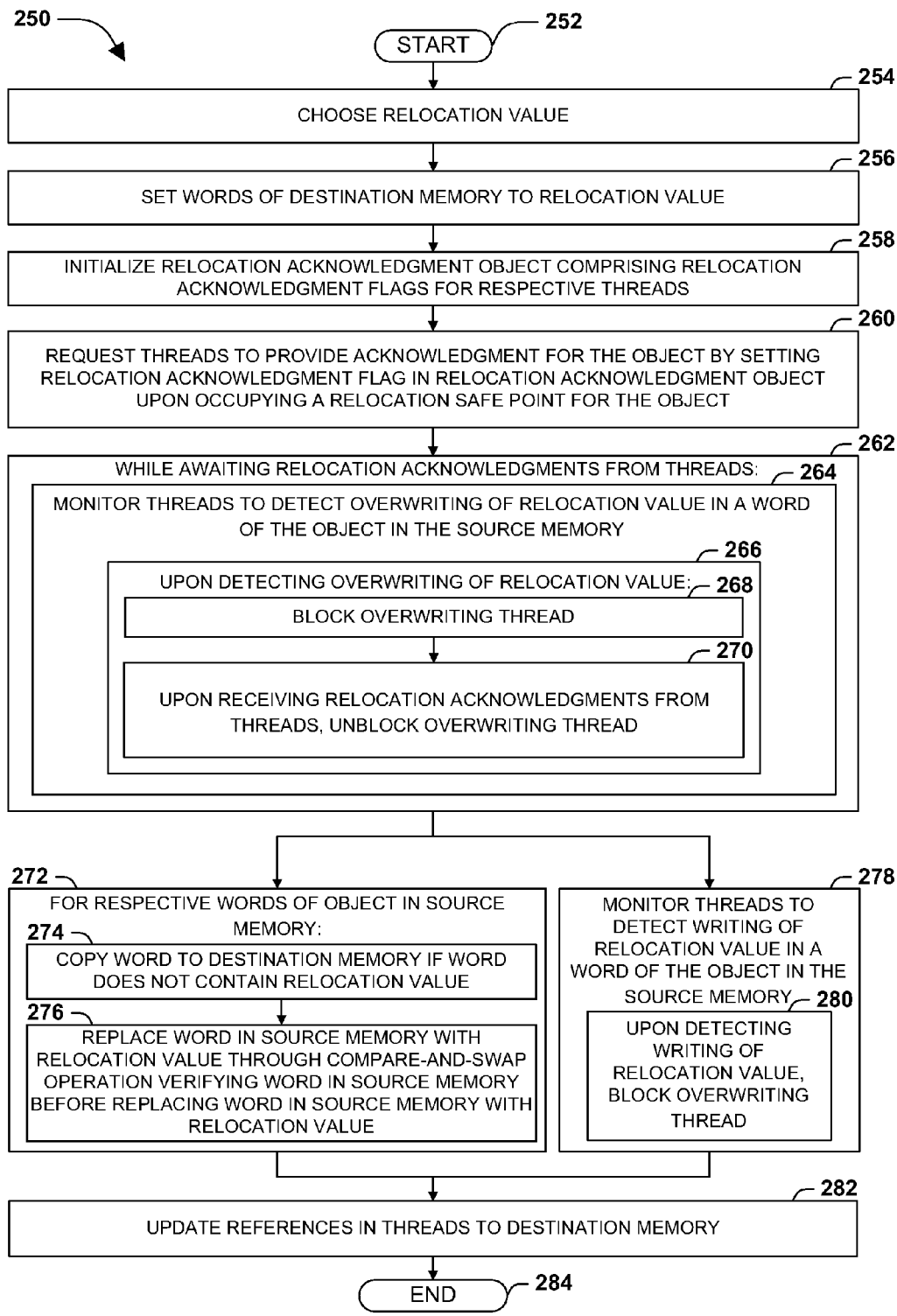
FIG. 19 is a flow diagram illustrating another exemplary method of relocating an object.

Within this computing environment, the exemplary method 250 of FIG. 19 accomplishes the relocation of the object in the following manner. The exemplary method 250 begins at 252 and involves choosing a relocation value 254 and setting the words of the destination memory to the relocation value 256. The exemplary method 250 also involves initializing a relocation acknowledgment object comprising relocation acknowledgment flags for respective threads 258 (such as the relocation acknowledgment object 156 illustrated in FIG. 10.) The exemplary method 250 also involves requesting the threads to provide a relocation acknowledgment for the object by setting the relocation acknowledgment flag in the relocation acknowledgment object upon occupying a relocation safe point for the object 260. While awaiting the relocation acknowledgments from the threads 262, the exemplary method 250 involves monitoring the threads to detect an attempted overwriting of a relocation value in a word of the object in the source memory by an overwriting thread 264. Upon detecting the attempted overwriting of the relocation value 266, the exemplary method 250 involves generating a relocation acknowledgment and blocking the overwriting thread until the relocation acknowledgments have been received from the threads 268; and upon receiving the relocation acknowledgments from the threads, the exemplary method 250 involves unblocking the overwriting thread 270.

Upon receiving the relocation acknowledgment for the object from the threads, the exemplary method 250 involves two concurrent tasks. First, the exemplary method 250 involves relocating the words of the object in the source memory 272 by copying respective words to the destination memory if the word does not contain the relocation value 274 and replacing the word with the relocation value through a compare-and-swap operation that verifies the word in the source memory before replacing the word in the source memory with the relocation value 276. Second, during the relocating of respective words of the object in the source memory 272, the exemplary method 250 involves monitoring the threads to detect an attempted writing of the relocation value in a word of the object in the source memory 278. Upon detecting the attempted writing of the relocation value, the exemplary method 250 involves blocking the writing thread until the copying is complete 280. After relocating the respective words of the object in the source memory 272 while monitoring the threads to detect the writing of the relocation value in a word of the object in the source memory 278, the exemplary method 250 involves updating the references to the destination memory 282. Having relocated the object representation to the destination memory while safeguarding against activities by the threads that may compromise the relocation, the exemplary method 250 achieves the relocation of the object, and so ends at 284.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it may be appreciated that a carrier wave can be employed to carry computer-readable electronic data such as those used in transmitting and receiving electronic mail or in accessing a network such as the Internet or a local area network (LAN). Of course, those skilled in the art may recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of relocating to a destination memory of a device having a processor an object located in a source memory and referenced by at least one reference, the method utilizing a relocation value and comprising:
   executing on the processor instructions configured to:
     for respective words of the object in the source memory:
       copying the word to the destination memory, and
       replacing the word in the source memory with the relocation value; and after the copying, updating the at least one reference to the destination memory, and the at least one thread configured to access the words of the object in the destination memory during the relocation where corresponding words in the source memory contain the relocation value.

2. The method of claim 1, the source memory comprising an object header for the object comprising the address of the destination memory.

3. The method of claim 1, comprising:
before the copying, randomly choosing a relocation value for relocating the object.

4. The method of claim 1, the replacing performed through a compare-and-swap operation verifying the word in the source memory before replacing the word in the source memory with the relocation value.

5. The method of claim 1, the at least one thread configured to write to words of the object in the source memory through a compare-and-swap operation verifying that the word in the source memory does not contain the relocation value.

6. The method of claim 1, comprising:
before the copying, setting the words of the destination memory to the relocation value.

7. The method of claim 1, comprising: before copying the object, requesting a relocation acknowledgment for the object from the at least one thread; and
the copying occurring after receiving the relocation acknowledgment for the object from the at least one thread, and
the at least one thread configured to provide the relocation acknowledgment upon occupying a safe point for the object.

8. The method of claim 7, the requesting comprising:
before the copying, initializing a relocation acknowledgment object comprising relocation acknowledgment flags for respective threads; and
before the copying, requesting the at least one thread to set the relocation acknowledgment flag in the relocation acknowledgment object upon occupying a relocation safe point for the object.

9. The method of claim 7, comprising:
while awaiting the relocation acknowledgments from the at least one thread:
monitoring the at least one thread to detect an overwriting of a relocation value in a word of the object in the source memory by an overwriting thread; and
upon detecting the overwriting of the relocation value, preventing the overwriting.

10. The method of claim 9, the preventing comprising:
upon detecting the overwriting of the relocation value, blocking the overwriting thread until the relocation acknowledgments have been received from the at least one thread; and
upon receiving the relocation acknowledgments from the at least one thread, unblocking the overwriting thread.

11. The method of claim 10, the blocking comprising: generating a relocation acknowledgment for the overwriting thread.

12. The method of claim 1, comprising:
during the copying, monitoring the at least one thread to detect a writing of the relocation value in a word of the object in the source memory by a writing thread; and
upon detecting the writing of the relocation value, blocking the writing thread until the copying is complete.

13. The method of claim 1, the copying comprising: copying the word to the destination memory if the word does not contain the relocation value.

14. The method of claim 1, respective references managed by a thread, and respective threads configured to update the references managed by the thread.

15. A system for relocating to a destination memory an object located in a source memory and referenced by at least one reference, the system comprising:
a relocation information memory comprising the relocation value;
an object relocating component configured to:
for respective words of the object in the source memory:
copy the word to the destination memory, and
replace the word in the source memory with the relocation value stored in the relocation information memory; and
an object reference updating component configured to update the at least one reference to the destination memory;
and the at least one thread configured to access the words of the object in the destination memory during the relocation where corresponding words in the source memory contain the relocation value stored in the relocation information memory.

16. The system of claim 15, comprising:
a destination memory initialization component configured, before the copying, to set words of the destination memory to the relocation value stored in the relocation information memory.

17. The system of claim 15, comprising:
a acknowledgment component configured:
to initialize a relocation acknowledgment object comprising a relocation acknowledgment flag for respective threads, and
before copying and replacing the object through the object copying component, to request the at least one thread to set the relocation acknowledgment flag upon occupying a relocation safe point for the object.

18. The system of claim 17, comprising:
a relocation value overwriting detection component configured, while awaiting the relocation acknowledgments from the at least one thread, to:
monitor the at least one thread to detect an overwriting of a relocation value in a word of the object in the source memory by an overwriting thread; and
upon detecting the overwriting of the relocation value:
block the overwriting thread until the relocation acknowledgments have been received from the at least one thread; and
upon receiving the relocation acknowledgments from the at least one thread, unblock the overwriting thread.

19. The system of claim 15, comprising:
a relocation value writing detection component configured, during the copying, to:
monitor the at least one thread to detect a writing of the relocation value in a word of the object in the source memory by a writing thread; and
upon detecting the writing of the relocation value, block the writing thread until the copying is complete.

20. A method of relocating to a destination memory an object located in a source memory referenced by at least one reference, respective references managed by a thread, and the method comprising:
choosing a relocation value;
setting the words of the destination memory to the relocation value;

initializing a relocation acknowledgment object comprising relocation acknowledgment flags for respective threads;
requesting the at least one thread to provide a relocation acknowledgment for the object by setting the relocation acknowledgment flag in the relocation acknowledgment object upon occupying a relocation safe point for the object;
while awaiting the relocation acknowledgments from the at least one thread:
monitoring the at least one thread to detect an overwriting of a relocation value in a word of the object in the source memory by an overwriting thread, and
upon detecting the overwriting of the relocation value:
blocking the overwriting thread until the relocation acknowledgments have been received from the at least one thread, and
upon receiving the relocation acknowledgments from the at least one thread, unblocking the overwriting thread;
upon receiving the relocation acknowledgment for the object from the at least one thread:
for respective words of the object in the source memory:
copying the word to the destination memory if the word does not contain the relocation value, and
replacing the word in the source memory with the relocation value through a compare-and-swap operation verifying the word in the source memory before replacing the word in the source memory with the relocation value;
during relocating of respective words of the object:
monitoring the at least one thread to detect a writing of the relocation value in a word of the object in the source memory by a writing thread, and
upon detecting the writing of the relocation value, blocking the writing thread until the copying is complete; and
after relocating the respective words of the object, updating the at least one reference to the destination memory;
and the at least one thread configured to:
access the words of the object in the destination memory during the relocation where corresponding words in the source memory contain the relocation value;
write to words of the object in the source memory through a compare-and-swap operation verifying that the word in the source memory does not contain the relocation value.

* * * * *